US008045828B2

(12) United States Patent
Goto et al.

(10) Patent No.: US 8,045,828 B2
(45) Date of Patent: Oct. 25, 2011

(54) APPARATUS FOR PROCESSING IMAGES, AND METHOD AND COMPUTER PROGRAM PRODUCT FOR DETECTING IMAGE UPDATES

(75) Inventors: Masataka Goto, Kanagawa (JP); Yasuyuki Nishibayashi, Kanagawa (JP); Shinya Murai, Kanagawa (JP); Mika Minematsu, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 819 days.

(21) Appl. No.: 12/073,841

(22) Filed: Mar. 11, 2008

(65) Prior Publication Data

US 2009/0016566 A1  Jan. 15, 2009

(30) Foreign Application Priority Data

Jul. 9, 2007 (JP) ................................ 2007-179673
Sep. 3, 2007 (JP) ................................ 2007-228052

(51) Int. Cl.
*G06K 9/60* (2006.01)
(52) U.S. Cl. ........ 382/304; 382/189; 382/235; 382/243; 382/305; 358/1.16; 358/426.05
(58) Field of Classification Search .................. 382/303, 382/304, 305, 307, 187, 189, 235, 243; 358/1.16, 358/426.05
See application file for complete search history.

(56) References Cited

U.S. PATENT DOCUMENTS

| 5,506,975 | A | 4/1996 | Onodera |
| 6,005,592 | A | 12/1999 | Koizumi et al. |
| 6,559,855 | B1 | 5/2003 | Kawase et al. |
| 6,601,233 | B1 * | 7/2003 | Underwood ................... 717/102 |
| 6,957,186 | B1 * | 10/2005 | Guheen et al. ................ 705/323 |
| 7,072,934 | B2 * | 7/2006 | Helgeson et al. ............. 709/203 |
| 7,130,807 | B1 * | 10/2006 | Mikurak ....................... 705/7.25 |
| 7,181,679 | B1 * | 2/2007 | Taylor ........................... 715/234 |
| 7,272,799 | B2 | 9/2007 | Imada et al. |
| 7,368,918 | B2 * | 5/2008 | Henson et al. ................ 324/536 |
| 7,380,236 | B2 * | 5/2008 | Hawley .......................... 717/109 |
| 7,457,656 | B2 * | 11/2008 | Judd et al. ..................... 600/407 |
| 7,506,265 | B1 | 3/2009 | Traut et al. |
| 7,577,722 | B1 | 8/2009 | Khandekar et al. |

(Continued)

FOREIGN PATENT DOCUMENTS

JP 10-105367 4/1998

(Continued)

OTHER PUBLICATIONS

"Suspending and Resuming Virtual Machines," http://www.umware.com/support/esx2/doc/esxadmin_remote-console8.html#1004281.

(Continued)

*Primary Examiner* — Yosef Kassa
(74) *Attorney, Agent, or Firm* — Nixon & Vanderhye, P.C.

(57) ABSTRACT

The address calculating unit calculates a virtual address of a page for each pixel of a rectangular region of a predetermined size that is included in a screen. The acquiring unit acquires a physical address in correspondence with the virtual address of each pixel of the image information for which writing is requested, in accordance with a conversion table. The writing unit writes the image information for which writing is requested at the acquired physical address. The detecting unit detects an updated portion of the image information the content of which does not match before and after the writing, in units of pages. The compressing unit compresses the image information of the updated portion that is detected.

11 Claims, 18 Drawing Sheets

U.S. PATENT DOCUMENTS

| | | |
|---|---|---|
| 7,634,681 B2 | 12/2009 | Takamoto et al. |
| 7,680,919 B2 | 3/2010 | Nelson |
| 7,720,672 B1 | 5/2010 | Buswell et al. |
| 2003/0001853 A1 | 1/2003 | Obayashi |
| 2005/0108440 A1 | 5/2005 | Baumberger et al. |
| 2005/0132364 A1 | 6/2005 | Tewari et al. |
| 2006/0005189 A1 | 1/2006 | Vega et al. |
| 2006/0092466 A1 | 5/2006 | Ikeda |
| 2006/0187217 A1 | 8/2006 | Son et al. |
| 2007/0067739 A1 | 3/2007 | Atarashi et al. |
| 2007/0300220 A1 | 12/2007 | Seliger et al. |
| 2007/0300221 A1 | 12/2007 | Hartz et al. |
| 2008/0104608 A1 | 5/2008 | Hyser et al. |
| 2008/0229227 A1 | 9/2008 | Bantz et al. |
| 2008/0235361 A1 | 9/2008 | Crosbie et al. |
| 2008/0244577 A1 | 10/2008 | Le et al. |
| 2008/0244579 A1 | 10/2008 | Muller |
| 2008/0301673 A1 | 12/2008 | Kawasaki et al. |
| 2009/0077361 A1 | 3/2009 | Neiger et al. |
| 2009/0112972 A1 | 4/2009 | Liu |
| 2009/0147014 A1 | 6/2009 | Minematsu et al. |
| 2009/0193414 A1 | 7/2009 | Broussard et al. |
| 2009/0198809 A1 | 8/2009 | Goto et al. |
| 2009/0300605 A1 | 12/2009 | Edwards et al. |
| 2010/0088699 A1 | 4/2010 | Sasaki |
| 2010/0186012 A1 | 7/2010 | Imada et al. |

FOREIGN PATENT DOCUMENTS

| | | |
|---|---|---|
| JP | 11-331610 | 11/1999 |
| JP | 2003-084751 | 3/2003 |
| JP | 2003-085135 | 3/2003 |
| JP | 2004-086550 | 3/2004 |
| JP | 2007-025073 | 2/2007 |

OTHER PUBLICATIONS

Goto et al., U.S. Appl. No. 12/320,212, filed Jan. 21, 2009.
Minematsu et al., U.S. Appl. No. 12/314,244, filed Dec. 5, 2008.
Lin Tan et al.; "iKernel: Isolating Buggy and Malicious Device Drivers Using Hardware Virtualization Support"; Third IEEE International Symposium on Dependable, Autonomic and Secure Computing; IEEE Computer Society 2007; pp. 134-142.
Anonymous; "Double Buffering and Page Flipping"; Internet Article May 9, 2001, pp. 1-3; XP-002516561; URL: http://web.archive.org/web/20010509192614/http://java.sun.com/docs/books/tutorial/extra/fullscreen/doublebuf.html; retrieved Feb. 23, 2009; pp. 2-3.
Adams K.; "Graphics and I/O Virtualization"; Internet Article Dec. 16, 2005, pp. 1-2; XP002516562; URL:http//www.x86vmm.blogspot.com/2005/12/graphics-and-io-virtualization.html ; retrieved Feb. 20, 2009; p. 1.
"What is Xen", [Online], http://xen.org/, retrieved Aug. 1, 2008.
"Virtualization via Hypervisor, Virtual Machine & Server Consildation", [Online], http://www.vmware.com/ , retrieved Aug. 1, 2008.
Office Action dated Apr. 26, 2011 in JP 2007-228052 and English-language translation thereof.

\* cited by examiner

FIG.4

| | | | | | | | | | | | |
|---|---|---|---|---|---|---|---|---|---|---|---|
| 000000 | 000004 | 000008 | 00000c | 000010 | 000014 | 000018 | 00001c | 000020 | 000024 | 000028 | ... 000ffc |
| 001000 | 001004 | 001008 | 00100c | 001010 | | | | | | | 001ffc |
| 002000 | 002004 | 002008 | | | | | | | | | 002ffc |
| 003000 | 003004 | | | | | | | | | | 003ffc |
| 004000 | 004004 | | | | | | | | | | 004ffc |
| 005000 | | | | | | | | | | | 005ffc |
| 006000 | | | | | | | | | | | 006ffc |
| 007000 | | | | | | | | | | | 007ffc |
| 008000 | | | | | | | | | | | 008ffc |
| 009000 | | | | | | | | | | | 009ffc |
| 00a000 | | | | | | | | | | | 00affc |
| 2ff000 | 2ff004 | 2ff008 | 2ff00c | 2ff010 | 2ff014 | 2ff018 | 2ff01c | 2ff020 | 2ff024 | 2ff028 | ... 2fffc |

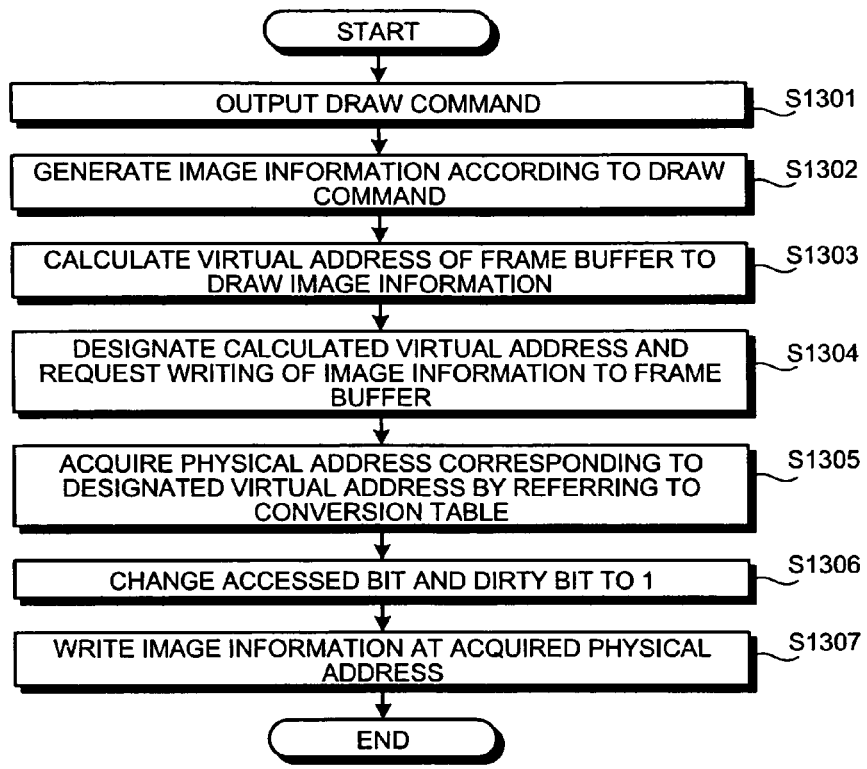
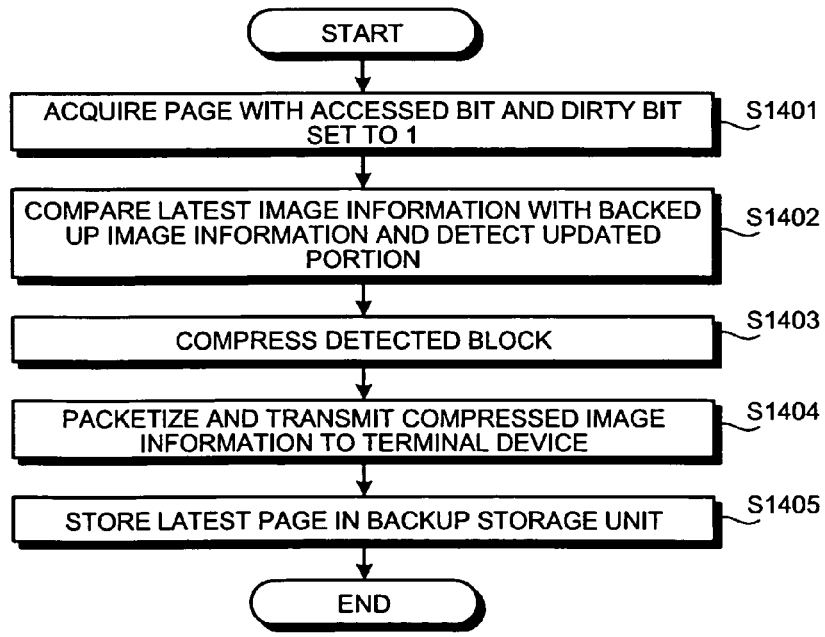

APPARATUS FOR PROCESSING IMAGES, AND METHOD AND COMPUTER PROGRAM PRODUCT FOR DETECTING IMAGE UPDATES

CROSS-REFERENCE TO RELATED APPLICATIONS

This application is based upon and claims the benefit of priority from the prior Japanese Patent Application No. 2007-179673, filed on Jul. 9, 2007; and Japanese Patent Application No. 2007-228052, filed on Sep. 3, 2007, the entire contents of both of which are incorporated herein by reference.

BACKGROUND OF THE INVENTION

1. Field of the Invention

The present invention relates to an apparatus for generating image information that is to be transmitted to a terminal device connected by way of a network, and a method and a computer program product for detecting image updates.

2. Description of the Related Art

Computers with an image displaying function, such as personal computers (PC), are generally provided with a frame buffer such as a video random access memory (VRAM) to hold graphic data (image information) that is to be presented on a display. The frame buffer is formed of memory regions associated with X and Y coordinates, and has addresses assigned linearly in the raster scanning order. The LCD (liquid crystal display) controller and the CRT (cathode ray tube) controller obtain image information from the frame buffer in accordance with the raster scanning.

The frame buffer of a graphic device in a conventional computer is configured to arrange screen data linearly in the raster scanning direction of the screen display so that it is advantageous to display an image on the monitor connected to the computer.

On the other hand, systems have been developed to display on a terminal device a display screen of an application or the like running on a virtual computer server or to remotely control a terminal device. Such systems need to transmit the image information obtained from the frame buffer to an external device.

For instance, JP-A 2003-85135 (KOKAI) suggests a technology related to a remote operation system that operates a remote terminal from a local terminal. More specifically, JP-A 2003-85135 (KOKAI) shows a method of releasing the lock state of a remotely operated terminal by an input of a pass phrase from the operating terminal, while bringing the screen of the remote terminal into a power saving mode to improve security and save power during the remote operation.

With conventional technologies including JP-A 2003-85135 (KOKAI), data that is to be written into the frame buffer and data that is to be transmitted to a remotely operated terminal are determined in accordance with an update of the desktop screen, and image information of only the updated portion is transmitted. A computer having a high-specification graphic function can thereby handle the communication load that tends to increase. In addition, a technique of compressing an image at the time of image transmission to reduce the communication load is well known.

As an example of a method of detecting an updated portion of the image information stored in the frame buffer, a software program that writes data in the frame buffer generates a report on the coordinate information of the updated portion. There are drawbacks, however, in this method that the procedure of the software has to be changed to make a report on the coordinate information of the updated portion and that overhead increases owing to the report making.

If a processor has a virtual memory managing function, an updated portion of the image information may be detected by use of a memory management unit (MMU). Most MMUs are provided with a conversion table to calculate a physical address from a virtual address. On the conversion table, a value of a bit (dirty bit) is provided to determine whether data has been written to each page. In the method incorporating the MMU, an updated page is detected in accordance with the value of the dirty bit, and an updated portion of the image information is detected from the detected page.

There is a problem in this method of adopting a dirty bit of the conversion table, however, that the efficiency of detecting an updated portion is lowered. For instance, when a frame buffer has a structure in which an amount of data per pixel is 4 bytes and one page includes 4096 bytes and a screen includes 1024×768 pixels, one line in the raster scanning direction corresponds to one page.

For this reason, if an update is made to a rectangular region, for example, on a desktop application that deals with substantially a large number of rectangular graphics, updated pages the number of which corresponds to the number of lines equivalent to the height of the rectangle would be detected. Then, an updated portion of the rectangle has to be detected from all the updated pages that are detected. A small proportion of the updated portion to the update pages means that a large number of updated pages need to be subjected to the detection process to detect the updated portion.

SUMMARY OF THE INVENTION

According to one aspect of the present invention, an image processing apparatus generates image information for displaying a screen on a terminal device connected thereto via a network and transmits the image information to the terminal device.

The image processing apparatus includes a first image storage unit that stores the image information that is to be transmitted to the terminal device; a table storage unit that stores a conversion table that is used to convert a virtual address of the first image storage unit to a physical address in units of pages defined in a storage region of the first image storage unit in correspondence with a rectangular region of a predetermined size included in the screen; an address calculating unit that calculates the virtual address corresponding to a pixel included in the rectangular region; an acquiring unit that acquires the physical address corresponding to the virtual address calculated for each pixel of the image information for which writing is requested, based on the conversion table stored in the table storage unit; a writing unit that writes the image information for which the writing is requested into the physical address acquired by the acquiring unit; a detecting unit that detects in units of the pages, an updated portion of the image information that is a portion in which the image information does not match before and after the writing; and a compressing unit that compresses the image information of the updated portion detected by the detecting unit.

According to another aspect of the present invention, a method of detecting an update of image information is performed in an image processing apparatus that generates image information for displaying a screen on a terminal device connected thereto via a network and transmits the image information to the terminal device, the apparatus including: a first image storage unit that stores the image information that is to be transmitted to the terminal device; and a table storage unit that stores a conversion table that is used to convert a virtual address of the first image storage unit to a physical address in units of pages defined in a storage region of the first image storage unit in correspondence with a rectangular region of a predetermined size included in the screen.

The method of detecting an update of an image information includes calculating the virtual address corresponding to a pixel included in the rectangular region; acquiring the physical address corresponding to the virtual address calculated for each pixel of the image information for which writing is requested, based on the conversion table stored in the table storage unit; writing the image information for which the writing is requested into the acquired physical address; and detecting in units of the pages, an updated portion of the image information that is a portion in which the image information does not match before and after the writing.

A computer program product according to still another aspect of the present invention causes a computer to perform the method according to the present invention.

BRIEF DESCRIPTION OF THE DRAWINGS

FIG. 4 is an explanatory diagram for showing an example of an arrangement of addresses of a frame buffer incorporated in a conventional computer;

FIG. 13 is a flowchart of the entire image writing process according to the second embodiment;

FIG. 14 is a flowchart of the entire updated portion detecting process according to the second embodiment;

DETAILED DESCRIPTION OF THE INVENTION

Exemplary embodiments of an image processing apparatus, and a method and a computer program product for detecting image updates according to the present invention will be explained in detail below with reference to the attached drawings.

An image processing apparatus according to a first embodiment forms addresses of a frame buffer in such a manner than a rectangular region of a screen corresponds to one page, and detects an updated page by use of a page exception raised when a page is updated in a virtual memory system. An updated portion of the image information can be thereby effectively detected.

In the following explanation, an example is dealt with, in which an image processing apparatus is realized as a virtual computer server that creates a virtual computer environment to provide a terminal device with various kinds of processing and offers the terminal device image information to display the result of the processing executed in the created computer environment. The application of the image processing apparatus is not limited to such a virtual computer server, but to any device that is configured to detect an updated portion from image information of a screen stored in a frame buffer.

Figure 1:
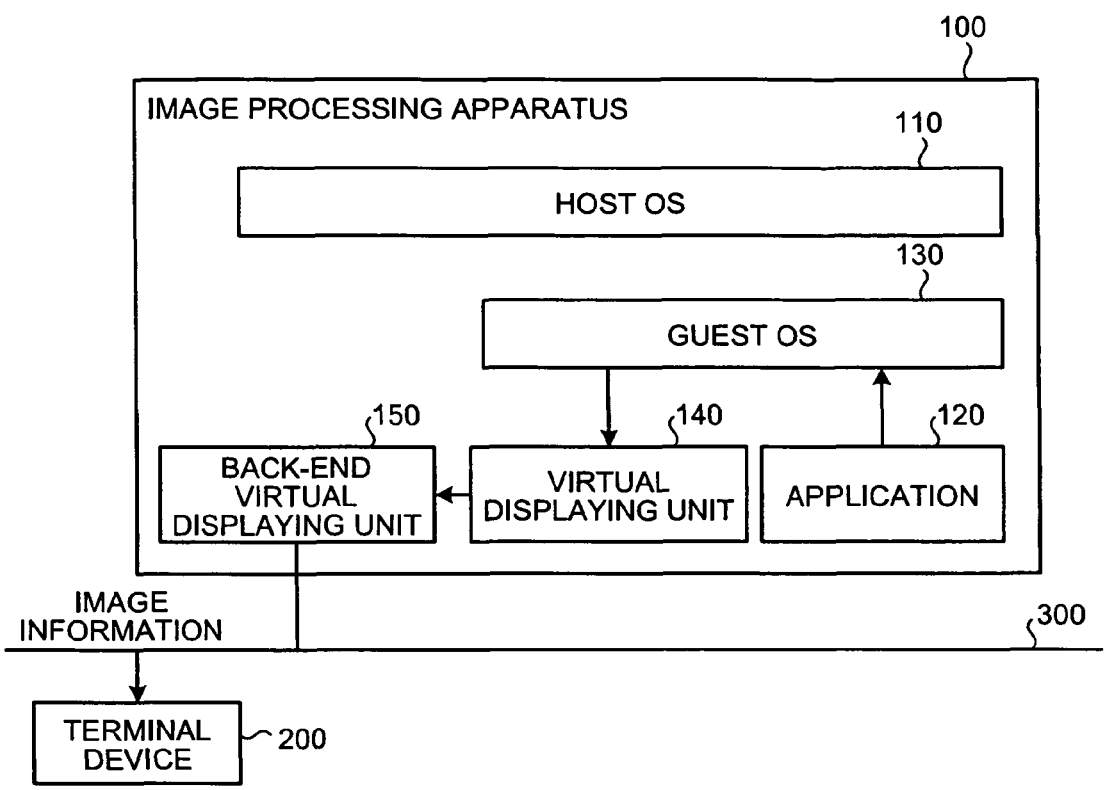
FIG. 1 is a block diagram of a network structure including an image processing apparatus according to a first embodiment.

As illustrated in FIG. 1, an image processing apparatus 100 is connected to a terminal device 200 on which a user performs operations, by way of a network 300 such as the Internet and a local area network (LAN).

The terminal device 200 has a function of displaying image information transmitted by the image processing apparatus 100 on its displaying device such as a display. It is assumed that the terminal device 200 has a function of receiving image information only of an updated portion of a screen transmitted by the image processing apparatus 100, and displaying only the updated portion in accordance with the received image information.

The image processing apparatus 100 includes a host OS 110 that serves as a fundamental system of operating the image processing apparatus 100, an application 120, a guest OS 130, a virtual displaying unit 140, and a back-end virtual displaying unit 150.

The guest OS 130 is an OS that runs on the host OS 110 and operates a virtual computing environment for the terminal device 200. The application 120 is a program that offers various types of processing to be executed on the guest OS 130.

The virtual displaying unit 140 is a virtual displaying device to which the image information generated by the guest OS 130 is output, and includes a frame buffer 142 that stores therein the image information, as described later. The back-end virtual displaying unit 150 is configured to execute common processing associated with image displaying, and runs on the host OS 110.

Next, the functions of the components of the image processing apparatus 100 are explained in detail with reference to FIG. 2.

The guest OS 130 includes a graphic library 131 as a function in association with image displaying. In addition to the image displaying function, the guest OS 130 also has various functions that are necessary to realize the virtual computing environment.

The graphic library 131 includes a renderer 132 and an address calculating unit 133.

The renderer 132 executes various kinds of image processing in accordance with a draw command designated by the application 120 or the like and outputs image information as a result of the processing. For instance, in response to a draw command of scaling an area up/down, the renderer 132 specifies the area to be scaled based on the coordinate information or the like included in the draw command. Then, the renderer 132 outputs the image information including the coordinate information of an area produced as a result of the scaling performed on the original area. The coordinate information may be indicated by coordinates of a screen of, for example, 1024×768 pixels such as the upper left corner of the screen being (0, 0) and the lower right corner of the screen being (1023, 767). According to the first embodiment, the coordinate information of a pixel on a screen is indicated by the X and Y coordinates, where the X-coordinate direction is a direction to the right of the screen while the Y-coordinate direction is a direction to the bottom of the screen.

The address calculating unit 133 receives the image information output by the renderer 132, and converts the coordinate information of the image information to the address of the frame buffer 142 (discussed later). According to the first embodiment, the address calculating unit 133 divides the display screen that is to be displayed on the terminal device 200 into rectangular regions each having 32×32 pixels and calculates virtual addresses of the frame buffer 142 in such a manner that each pixel in a divided rectangular region corresponds to a one-page-long (4096-byte) virtual address.

More specifically, the address calculating unit 133 converts the coordinate information (X, Y) to an address addr of the frame buffer 142 in accordance with the formula (2), in place of the conventional formula (1). In these formulae, OFFSET denotes an offset value before the start address of starting to store the image information.

$$addr=OFFSET+(X<<2)+(Y<<12) \quad (1)$$

$$addr=OFFSET+((X\&\sim0\times1f)<<10)\times3+((X\&0\times1f)<<2)+(Y<<7) \quad (2)$$

The actual calculation formula may be optimized in various manners according to a display mode and the calculation capacity of the address calculating unit 133.

The virtual displaying unit 140 includes a memory managing unit 141 and the frame buffer 142. The memory managing unit 141 manages accesses to the frame buffer 142 in a virtual memory system, and includes a table storage unit 141a, an acquiring unit 141b, a changing unit 141c, a writing unit 141d, and an exception raising unit 141e.

The table storage unit 141a stores therein a conversion table that is used to convert a virtual address to a physical address. The detailed structure of the conversion table and the address conversion process performed by the memory managing unit 141 based on the conversion table are explained with reference to FIG. 3.

With the virtual address system, the software program gains access to a logically linear memory space in a virtual address space by use of a virtual address. According to the present embodiment, a 32-bit virtual address is adopted. Furthermore, the 32-bit virtual address is divided into 10, 10, and 12 bits, where each bit is given a meaning, as indicated below.

Figure 3:
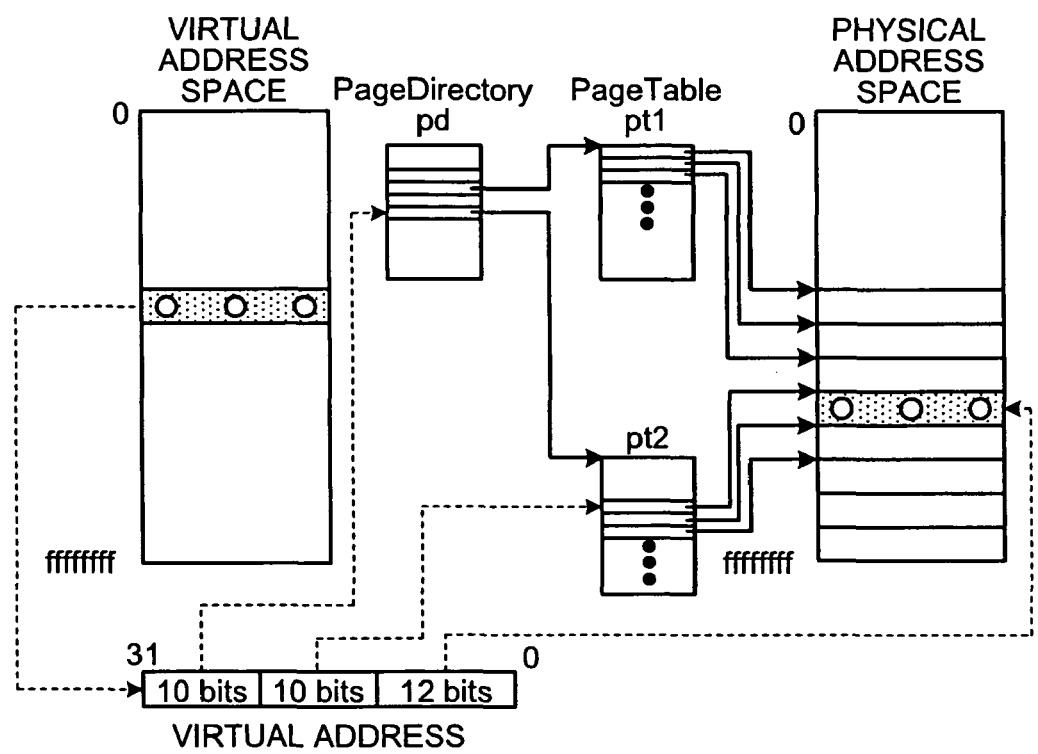
FIG. 3 is an explanatory diagram of a process of converting a virtual address to a physical address.

The highest 10 bits of a virtual address are used to specify an entry in a PageDirectory (pd), which is a higher-level table of a two-level-structured conversion table. The specified entry includes a pointer that specifies one of PageTables, which are lower-level tables. FIG. 3 is a diagram for showing an example of a PageTable pt2 being specified.

The middle 10 bits of the virtual address are used to specify an entry in the PageTable specified by the pointer. The specified entry includes a pointer that specifies a page block (hereinafter, "page") in a physical address space. A page is the smallest unit of a physical memory that can be mapped to a virtual address, and physical memories are consecutively assigned to pages.

The lowest 12 bits of the virtual address are an offset of the page specified by the pointer. In this manner, a 32-bit virtual address can be converted to a physical address.

The entries in the PageDirectory and the PageTable are explained in detail below.

An entry in the PageDirectory includes a pointer for a PageTable, an Enable bit that indicates the enabled/disabled state of the entry, and an Accessed bit that is set to 1 when the entry is referred to in the process of converting the virtual address to the physical address.

An entry in the PageTable includes a pointer for a page of a physical memory, an Enable bit that indicates the enabled/disabled state of the entry, a Writable bit that indicates whether data can be written into the page, a Dirty bit that is set to 1 when data is written in the page, and an Accessed bit that is set to 1 when the entry is referred to in the process of converting the virtual address to the physical address.

An entry usually includes information as indicated above, although the names of the bits may differ depending on the processor, and a negative logic may be adopted in place of a positive logic.

Figure 2:
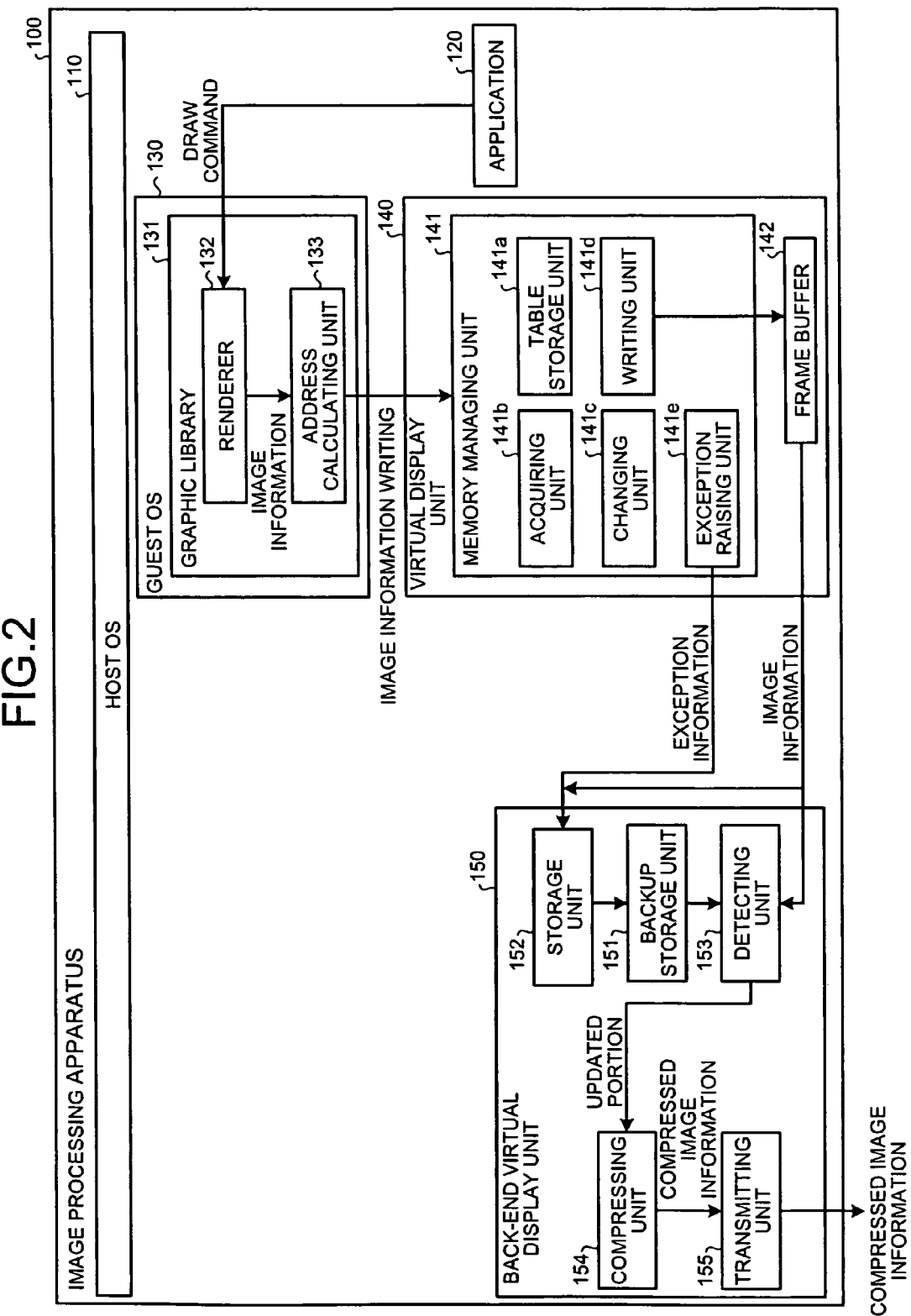
FIG. 2 is a block diagram of the image processing apparatus according to the first embodiment.

In the structure of FIG. 2, the acquiring unit 141b uses the conversion table configured as above to acquire a physical address that corresponds to the virtual address of the image information that is requested to be written into the frame buffer 142.

The changing unit 141c changes the information of each entry in the conversion table in response to the request for the access to the frame buffer 142. For instance, the changing unit 141c changes the Accessed bit and the Dirty bit of the PageTable that corresponds to the page including the virtual address of the image information for which the writing is requested, to 1. At the same time, the changing unit 141c changes the Accessed bit of the PageDirectory to 1.

The writing unit 141d writes the requested image information into the space at the physical address acquired by the acquiring unit 141b.

The exception raising unit 141e raises a page exception to the write-requested page. More specifically, the exception raising unit 141e raises a page exception when a request is made to a page whose Writable bit indicates a non-writable state. At the beginning, all the Writable bits are set to non-writable. With this setting, a page exception can be raised whenever writing is requested.

The exception raising unit 141e also raises other exceptions that are dealt with in a regular virtual memory system. For instance, when an access to a virtual address space is requested and the acquiring unit 141b searches across the conversion table, the exception raising unit 141e raises a page exception to the processor (not shown) if the Enable bit of the searched entry in the PageDirectory or in the PageTable is disabled.

When the page exception is raised, the processor can detect which virtual address the access is made to. Furthermore, when a page exception is raised, the processor executes a necessary process such as page mapping. The processor recovers from the exception after updating the conversion table if necessary.

The frame buffer 142 is a storage unit that stores therein the image information equivalent to one screen displayed on the terminal device 200. The frame buffer 142 stores therein the image information according to the physical address acquired by the acquiring unit 141b.

The address arrangement of the frame buffer 142 is explained in detail. First, the address arrangement of a frame buffer widely adopted in conventional computers is explained with reference to FIGS. 4 to 6.

FIG. 4 is a diagram for showing an example of the address arrangement where an amount of data per pixel in a 1024× 768-pixel screen is 4 bytes. A conventional frame buffer is configured to have addresses arranged consecutively in a horizontal direction, starting from the upper left corner of the screen.

Figure 5:
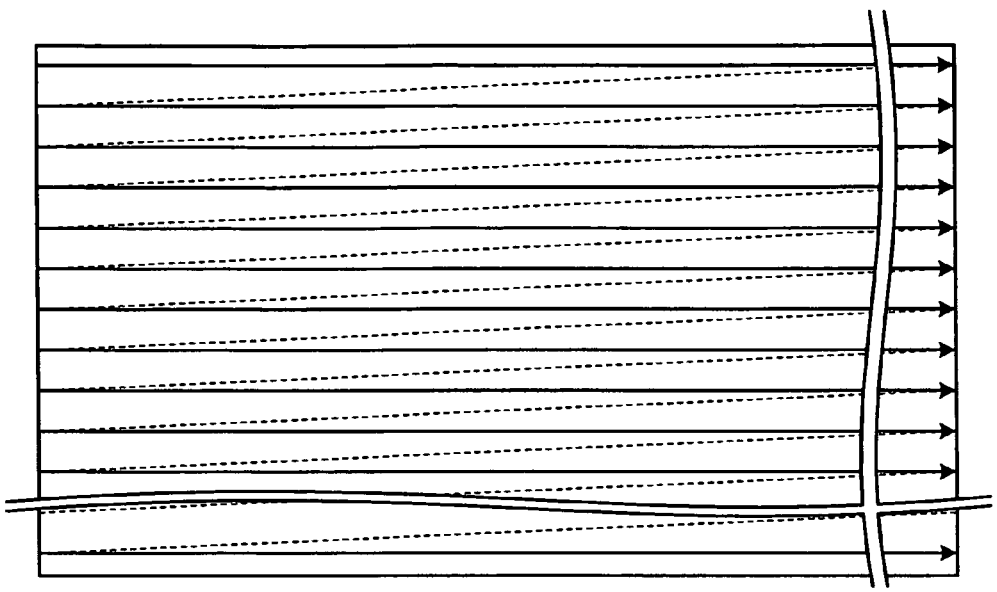
FIG. 5 is a schematic diagram for showing the order of addresses of a conventional frame buffer.

As shown in FIG. 5, the addresses of the conventional frame buffer are arranged linearly in a raster scanning direction in consideration of outputting data to a display unit such as a monitor.

Figure 6:
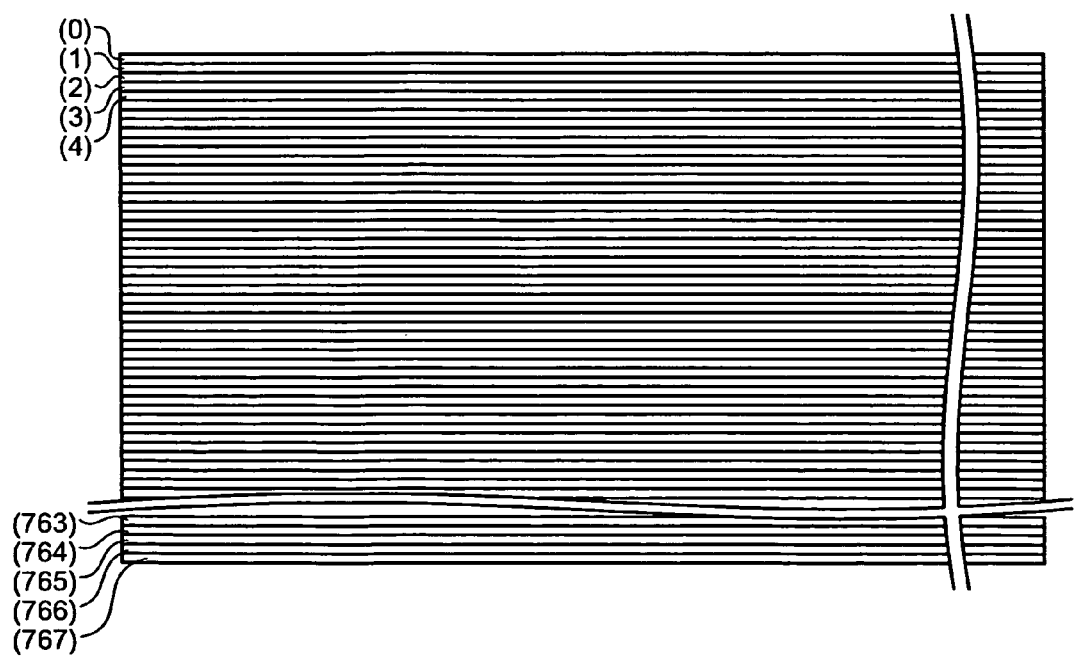
FIG. 6 is a schematic diagram for showing a correspondence between screen regions and pages in the conventional frame buffer.

According to FIG. 6, when a page includes 4096 bytes, it matches the amount of data per raster scanning, 4096 bytes (=1024×4 bytes). This means that one raster scanning corresponds to one page. For this reason, 768 pages are vertically arranged to form one screen.

Next, the address arrangement of the frame buffer 142 incorporated in the image processing apparatus 100 according to the first embodiment is explained with reference to FIG. 7.

According to the first embodiment, as indicated in the upper half of the drawing, addresses are linearly arranged in a 32×32-pixel rectangular region. Then, as shown in the lower half of the drawing, one screen is formed by arranging 32×24 rectangular regions each of which has this address arrangement.

The configuration of the rectangular region is not limited to 32×32 pixels, but any configuration may be adopted as long as one rectangular region can be associated with one-page addresses. Furthermore, the address arrangement of the rectangular region is not limited to the linear arrangement in the X direction. For instance, addresses may be arranged consecutively in the Y direction, and when pixels reach a certain number, continuing addresses may be further assigned to the pixels of the adjacent line in the Y direction.

In the structure of FIG. 2, the back-end virtual displaying unit 150 includes a backup storage unit 151, a storage unit 152, a detecting unit 153, a compressing unit 154, and a transmitting unit 155.

The backup storage unit 151 is a storage unit that stores therein backed-up data of the image information for each updated page.

The storage unit 152 stores therein, when the exception raising unit 141e raises a page exception in response to a request of writing in a page whose Writable bit shows a non-writable state, the image information of the page to which the page exception is raised in the backup storage unit 151.

The detecting unit 153 detects an updated portion of the image information for each page managed by the memory managing unit 141. More specifically, the detecting unit 153 first detects a page for which the image information has been backed up, as a page having updated image information. Thereafter, the detecting unit 153 compares, for each updated page, the image information stored in the backup storage unit 151 with the latest image information after the writing unit 141d writes the information into the frame buffer 142, and detects a rectangle that includes any difference as an updated portion.

The compressing unit 154 performs an image compressing process in JPEG format or the like onto the updated portion detected by the detecting unit 153. The compressing process performed by the compressing unit 154 is not limited to JPEG format, however.

The transmitting unit 155 transmits the image information (compressed image information) compressed by the compressing unit 154 to the terminal device 200.

The frame buffer 142 and the backup storage unit 151 may be formed of any memory medium that is widely used, such as a random access memory (RAM), a hard disk drive (HDD), an optical disk, and a memory card. In addition, the backup storage unit 151 may be provided not in the back-end virtual displaying unit 150 but, for example, in the virtual displaying unit 140.

Next, the image processing of the image processing apparatus 100 having the above structure according to the first embodiment is explained. The image processing includes an image writing process of writing the image information into the frame buffer 142 and the backup storage unit 151, and an updated portion detecting process of detecting the updated portion of the image information by comparing the backed-up image information with the latest image information.

Figure 8:
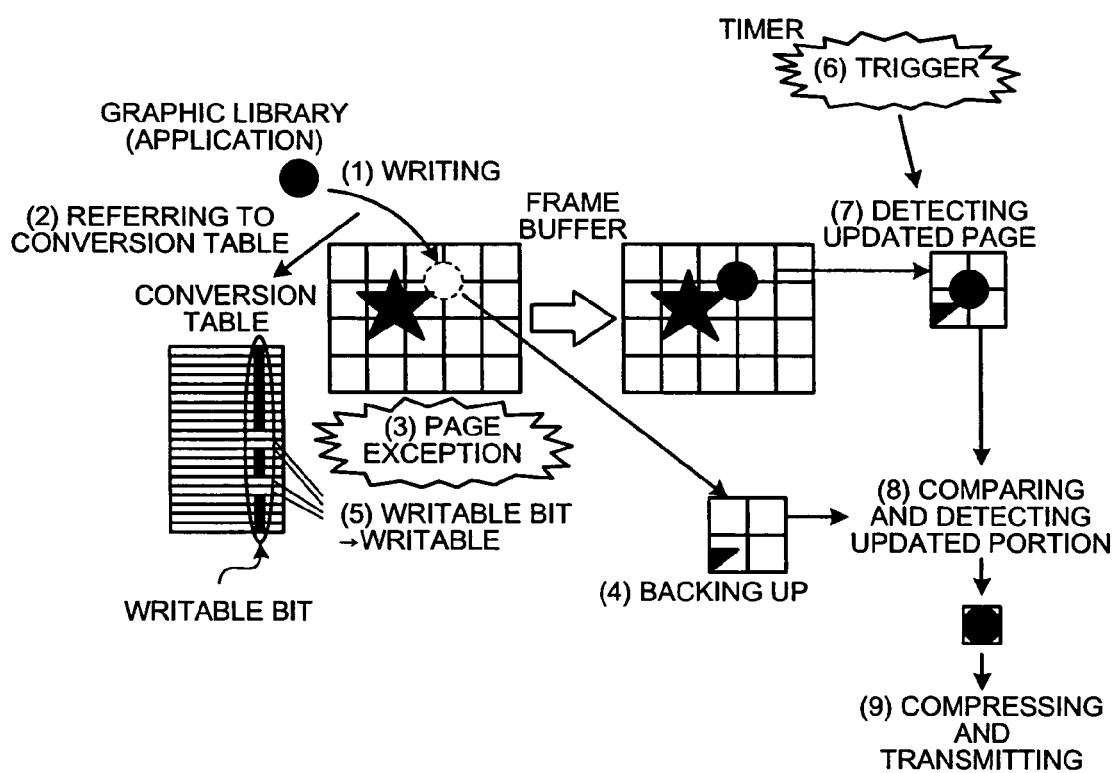
FIG. 8 is an explanatory diagram for showing an overview of an image writing process and an updated portion detecting process according to the first embodiment.

First, an overview of the image writing process and the updated portion detecting process is given with reference to FIG. 8.

In the image writing process, the Writable bits of all the PageTables associated with the memory regions of the frame buffer 142 are set to a non-writable state. When the graphic library 131 tries to write into any of the regions of the frame buffer 142 thereafter, a page exception is raised to the corresponding page.

In this situation, the application 120 sends a draw command to the frame buffer 142 by way of the graphic library 131 for a screen display (1). The memory managing unit 141 converts the virtual address designated by the draw command sent from the graphic library 131 to a physical address by referring to the conversion table (2).

Because the Writable bits of the PageTable are set to the non-writable state in advance, the exception raising unit 141e raises a page exception when the conversion table is referred to (3). Owing to the page exception, the storage unit 152 detects the page of the frame buffer 142 for which the graphic library 131 has requested an update, and saves a backup of the content of the page (4).

Meanwhile, the changing unit 141c changes the Writable bits of the PageTable of the page to a writable state (5). Then, the graphic library 131 is allowed to continue the image writing process. The image writing to this page is performed without a further page exception. A page exception is raised when trying to perform image writing to another page (3) so that the processes of backing up the content of the page (4) and changing the Writable bit of the PageTable (5) are sequentially performed.

In the above manner, pages are prepared in correspondence with the rectangular regions of the screen, and when image writing to a page is requested for the first time only, a page exception is raised to the requested page, creating a backup of the image information before the image writing. In other words, a process can be effectively performed, focusing only on the minimum pages.

Next, the detecting unit 153 executes the process of detecting an updated portion of the image information in accordance with an interrupt regularly caused by a timer, for example. The updated portion detecting process is performed on a page for which a backup has been created. The backup of the image information is compared with the image information of the page in the present state, and a rectangle having a page in which any difference is found is cut out. The timer may be set in such a manner that an interrupt occurs every 1/60 seconds if the screen of the terminal device 200 is updated 60 times a second.

With a trigger from the timer, the detecting unit 153 begins the updated portion detecting process (6). Next, the detecting unit 153 detects a page for which a backup is stored (4) as an updated page (7). Next, the detecting unit 153 compares the backup of the image information with the latest image information written in the frame buffer 142, and detects a rectangle including the updated portion (8). It should be noted that, as shown in FIG. 8, the detecting unit 153 can detect a rectangular region of the minimum size including the updated portion from several adjacent pages, as an updated portion.

The image information of the detected updated portion is compressed by the compressing unit 154. The compressed image information is transmitted to the terminal device 200 by the transmitting unit 155 (9).

It should be noted that, after the compressed image information of the updated portion is transmitted to the terminal device 200, the image information backed up in the backup storage unit 151 is deleted, although it is not illustrated in FIG. 8. In addition, the Writable bits of all the PageTables associated with the memory regions of the frame buffer 142 are changed to the non-writable state. In the drawing, the processes of raising the page exception (3), backing up (4), and changing the Writable bit (5) are illustrated as being implemented for four pages altogether. In actuality, however, these processes are executed for four times in response to the writing from the graphic library 131.

By forming a page that corresponds to a rectangular region on the screen, an updated portion can be detected in units of pages by using a page exception.

Figure 9:
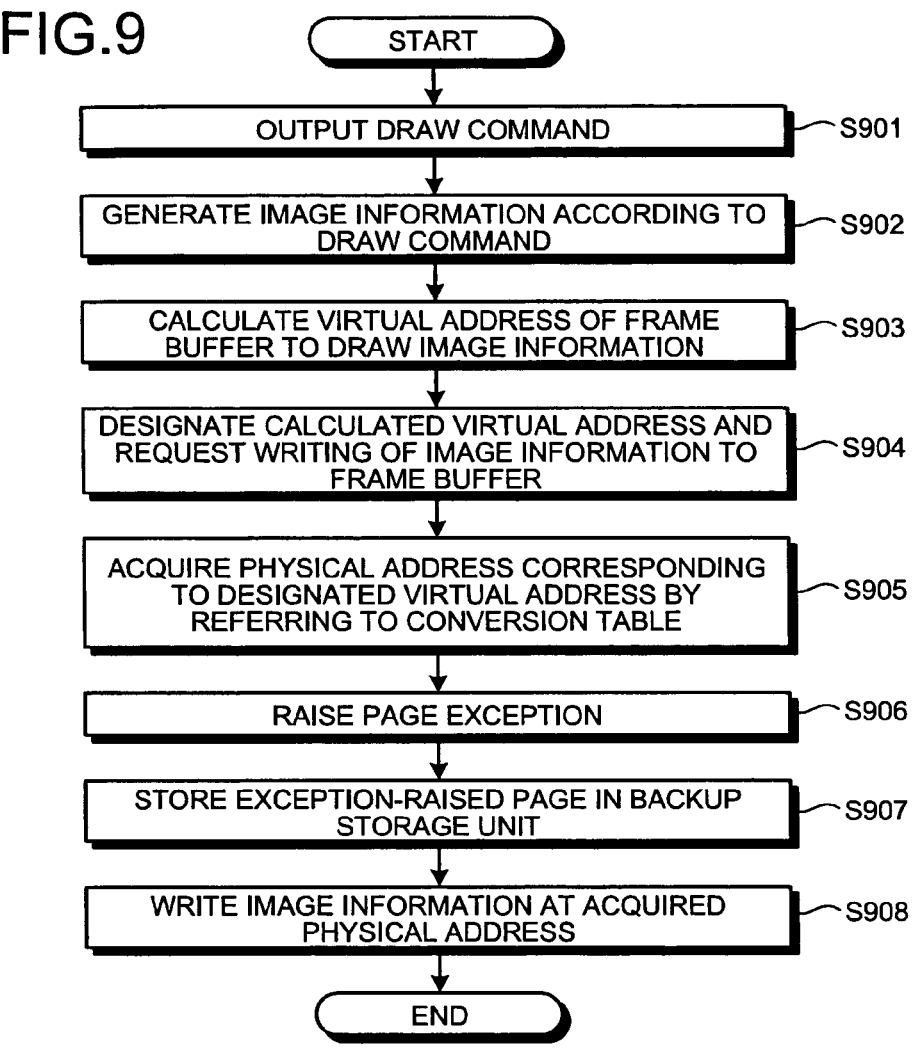
FIG. 9 is a flowchart of the entire image writing process according to the first embodiment.

The image writing process and the updated portion detecting process are explained in detail with reference to FIGS. 9 and 10.

First, the application 120 outputs a draw command to request drawing in the display screen when the screen information related to an implemented process or the like needs to be updated (step S901). Next, the renderer 132 performs an image processing in response to the draw command, and generates the image information as a result of the processing (step S902). The image information includes the coordinates of the starting point and the endpoint corresponding to the region that is updated.

Next, the address calculating unit 133 converts the coordinate information of a to-be-updated pixel to the virtual address in accordance with the frame buffer 142 in which the address arrangement is made in such a manner that a rectangular region of the screen correspond to a page (step S903). More specifically, the address calculating unit 133 calculates the virtual address by the formula (2) that is provided above.

The graphic library 131 designates the calculated virtual address, and requests writing of the image information to the frame buffer 142 (step S904).

Then, the acquiring unit 141b refers to the conversion table stored in the table storage unit 141a and acquires the physical address that corresponds to the designated virtual address (step S905). When the conversion table is referred to, the exception raising unit 141e raises a page exception to the page for which the writing is requested (step S906).

When detecting a page exception, the storage unit 152 stores the image information that corresponds to the page to which the page exception is raised in the backup storage unit 151 (step S907).

On the other hand, the writing unit 141d writes the requested image information into the space at the physical address obtained by the acquiring unit 141b at step S905 (step S908), and the image writing process is terminated.

Next, the updated portion detecting process will be explained in detail with reference to FIG. 10. The updated portion detecting process is initiated by an interrupt from the timer, as described above.

First, the detecting unit 153 detects a page a backup of which is created in the backup storage unit 151 (i.e. updated page) (step S1001). Then, the detecting unit 153 compares the latest image information written in at step S908 of FIG. 9 with the image information stored in the backup storage unit 151 with regard to the detected updated page, and detects a difference therebetween as an updated portion (step S1002).

Next, the compressing unit 154 compresses the updated portion detected by the detecting unit 153 (step S1003). Thereafter, the transmitting unit 155 packetizes the compressed image information and transmits the packets to the terminal device 200 (step S1004). Finally, the updated portion detecting process is terminated.

According to the first embodiment, the image processing apparatus forms addresses of the frame buffer in such a manner that each of the rectangular regions on a screen corresponds to one page, and detects an updated page in accordance with a page exception that is raised when updating the page by use of the virtual memory system. The updated portion of the image information can thereby be effectively detected, and the processing load in detection of the updated portion of the image can be reduced in the structure where the frame buffer is managed by the virtual memory system.

According to the first embodiment, the updated page is detected by use of a page exception. In contrast, according to a second embodiment, the image processing apparatus detects an updated page by referring to the value of a bit on the conversion table to which a change is made at the time of page updating.

Figure 11:
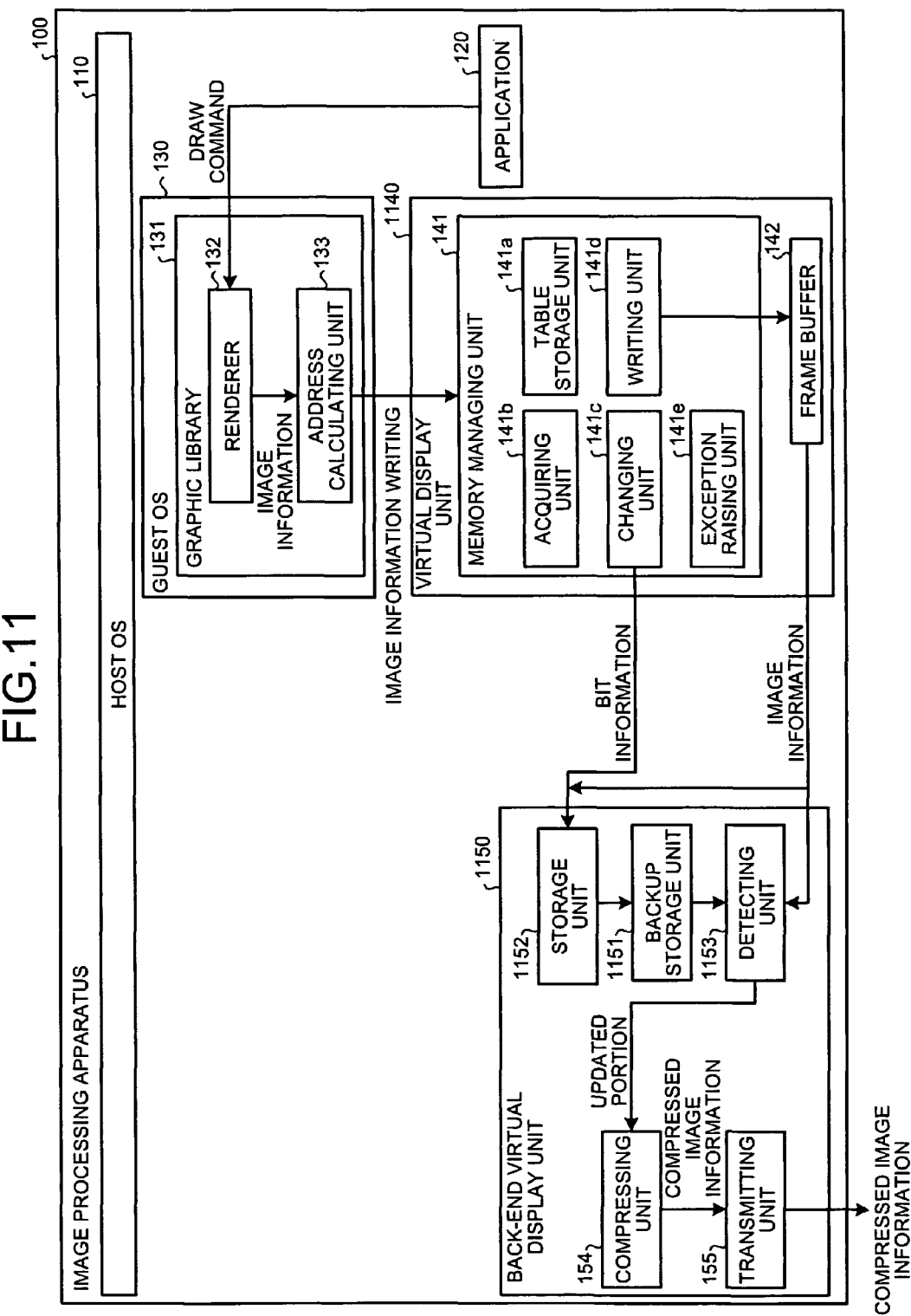
FIG. 11 is a block diagram of a structure of an image processing apparatus according to a second embodiment.

As shown in FIG. 11, an image processing apparatus 1100 includes the host OS 110, the application 120, the guest OS 130, a virtual display unit 1140, and a back-end virtual display unit 1150.

The functions of the virtual display unit 1140 and the back-end virtual display unit 1150 make a difference between the first and second embodiments. The rest of the structure and functions of the image processing apparatus 1100 is the same as the image processing apparatus 100 according to the first embodiment as shown in the block diagram of FIG. 2. The same structural components are given the same numerals, and the explanation thereof is omitted.

The virtual display unit 1140 includes a memory managing unit 1141 and the frame buffer 142. The frame buffer 142 has the same structure as that of the first embodiment, and thus is given the same numeral. The explanation of this component is therefore omitted.

The memory managing unit 1141 includes the table storage unit 141a, the acquiring unit 141b, the changing unit 141c, the writing unit 141d, and an exception raising unit 1141e. The structure and functions of the memory managing unit 1141 are the same as those of the image processing apparatus 100 according to the first embodiment as illustrated in the block diagram of FIG. 2, except for the exception raising unit 1141e. Thus, the same numerals are given to the same units, and the explanation thereof is omitted.

The exception raising unit 1141e is different from the exception raising unit 141e according to the first embodiment in that the exception raising unit 1141e is not provided with a function of raising a page exception to a page for which writing is requested.

The back-end virtual display unit 1150 includes a backup storage unit 1151, a storage unit 1152, a detecting unit 1153, the compressing unit 154, and the transmitting unit 155.

The back-end virtual display unit 1150 according to the second embodiment is different from the counterpart according to the first embodiment in the system of storing data into the backup storage unit 1151 and also in the functions of the storage unit 1152 and the detecting unit 1153. The rest of the structure and the functions of the back-end virtual display unit 1150 is the same as those of the image processing apparatus 100 according to the first embodiment as indicated in the block diagram of FIG. 2. Thus, the same units are provided with the same numerals, and the explanation thereof is omitted.

According to the first embodiment, backup data of the image information is stored for each page. However, the backup storage unit 1151 according to the second embodiment stores therein a backup of the entire image information in the frame buffer 142.

The storage unit 1152 stores the entire image information of the frame buffer 142 into the backup storage unit 1151 when the image processing apparatus 1100 is in the initial state or after the transmission of the updated portion is completed.

The detecting unit 1153 detects the updated page by referring to the Accessed bit of the PageDirectory, the Accessed bit of the PageTable, and the Dirty bit of the PageTable. This distinguishes the detecting unit 1153 from the detecting unit 153 according to the first embodiment.

The image processing performed by the image processing apparatus 1100 according to the second embodiment that is configured as above is now explained. First, an overview of the image writing process and the updated portion detecting process is given with reference to FIG. 12.

In the image writing process, the entire backup data of the frame buffer 142 is stored in advance into the backup storage unit 1151. If the pixel value of the frame buffer 142 can determine whether it is in the initial state, the backup does not always have to be created at this point. For instance, when all the pixels are black in the initial state, pixels being all black indicate that there is no backup. In this case, the backup creation may be omitted.

Then, the application 120 sends a draw command for screen display to the frame buffer 142 by way of the graphic library 131 (1). The memory managing unit 1141 refers to the conversion table, and converts the virtual address specified by the draw command from the graphic library 131, to a physical address.

When the memory managing unit 1141 refers to the conversion table, the changing unit 141c changes the Accessed bit of the entry in the PageDirectory that corresponds to the highest 10 bits of the virtual address, to 1. Furthermore, in the PageTable specified by this entry, the changing unit 141c changes the Accessed bit and Dirty bit of the entry that corresponds to the middle 10 bits of the virtual address, to 1 (2). Thereafter, the image writing is continued by the graphic library 131.

Next, the detecting unit 1153 executes the process of detecting the updated portion of the image information in response to an interrupt regularly caused by the timer or the like. First, the detecting unit 1153 begins the updated portion detecting process in accordance with a trigger from the timer (3). The detecting unit 1153 refers to the Accessed bits and the Dirty bits in the conversion table, and searches for a page having each bit set to 1 (4). An updated page is thereby detected (5). In particular, the detecting unit 1153 searches for entries in the PageDirectory related to the frame buffer 142 to find a PageTable with its Accessed bit being 1. The detecting unit 1153 searches for entries in the PageTable related to the frame buffer 142 to find a page with its Dirty bit being 1. The page in which the image has been updated can be thereby detected.

Next, in relation to the updated page that is detected, the detecting unit 1153 compares the backed up image information with the latest image information written in the frame buffer 142 and detects a rectangle including an updated portion (6).

The updated portion of the image information that is detected is compressed by the compressing unit 154. Furthermore, the compressed image information is transmitted by the transmitting unit 155 to the terminal device 200 (7).

Figure 12:
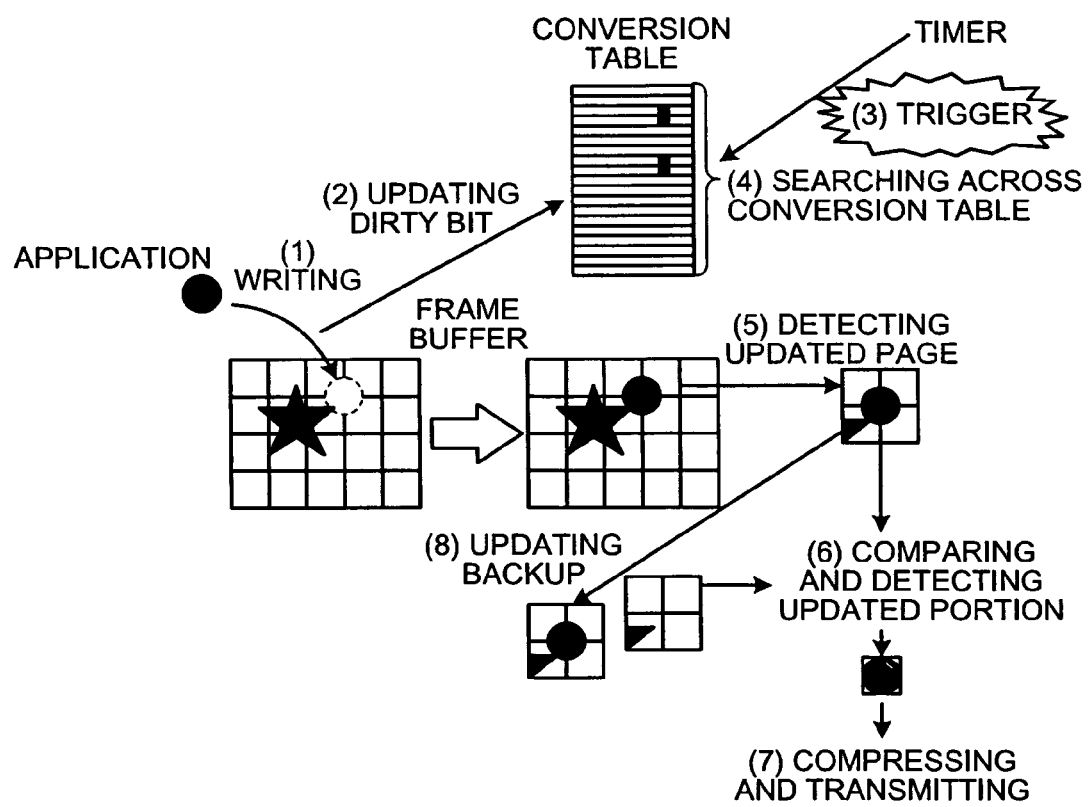
FIG. 12 is an explanatory diagram of an overview of an image writing process and an updated portion detecting process according to the second embodiment.

After the compressed image information of the updated portion is transmitted to the terminal device 200, the backup of the image information of the page is updated to include the latest content, although it is not shown in FIG. 12. Moreover, the Accessed bit and the Dirty bit of the conversion table are changed to 1.

The image writing process and the updated portion detecting process are explained in detail with reference to FIGS. 13 and 14.

The draw command process, the address calculating process, and the physical address acquiring process from steps S1301 through S1305 are the same as the processes from steps S901 through S905 performed by the image processing apparatus 100 according to the first embodiment, and the explanation thereof is omitted.

After the acquiring unit 141b acquires the physical address, the changing unit 141c changes the Accessed bit and the Dirty bit of the conversion table to 1 (step S1306). In the image writing process according to the first embodiment, the process of changing the Accessed bit and Dirty bit is not indicated in FIG. 9, but actually the same changing process as step S1306 is executed.

Next, the writing unit 141d writes the requested image information into the space of the physical address acquired by the acquiring unit 141b at step S1305 (step S1307), and the image writing process is terminated.

The image writing process according to the second embodiment does not include the process of raising a page exception and storing a backup of the page to which the page exception is raised, unlike the process according to the first embodiment.

The updated portion detecting process is explained in detail with reference to FIG. 14.

First, the detecting unit 1153 detects a page having the Accessed bit and the Dirty bit set to 1 (i.e. updated page) (step S1401). Next, the detecting unit 1153 obtains the image information that corresponds to the detected updated page from the backup storage unit 1151. The detecting unit 1153 compares the obtained image information with the latest image information, and detects a difference as an updated portion (step S1402).

The image compressing process and the image transferring process at steps S1403 and S1404 are the same as the processes performed on the image processing apparatus 100 at steps S1003 and S1004 according to the first embodiment, and the explanation thereof is omitted.

After the compressed image information is transmitted, the storage unit 1152 stores a backup of the latest image information written in the frame buffer 142 into the backup storage unit 1151 (step S1405), and the updated portion detecting process is terminated.

The image processing apparatus according to the second embodiment prepares addresses of the frame buffer in such a manner that each of the rectangular regions of the screen corresponds to a page, and detects an updated page by referring to the value of the bit of the conversion table to which a change is made at the time of updating the page. In this manner, the updated portion of the image information can be effectively detected, and the load of the updated portion detecting process can be reduced in the structure where the frame buffer is managed by a virtual memory system.

Figure 7:
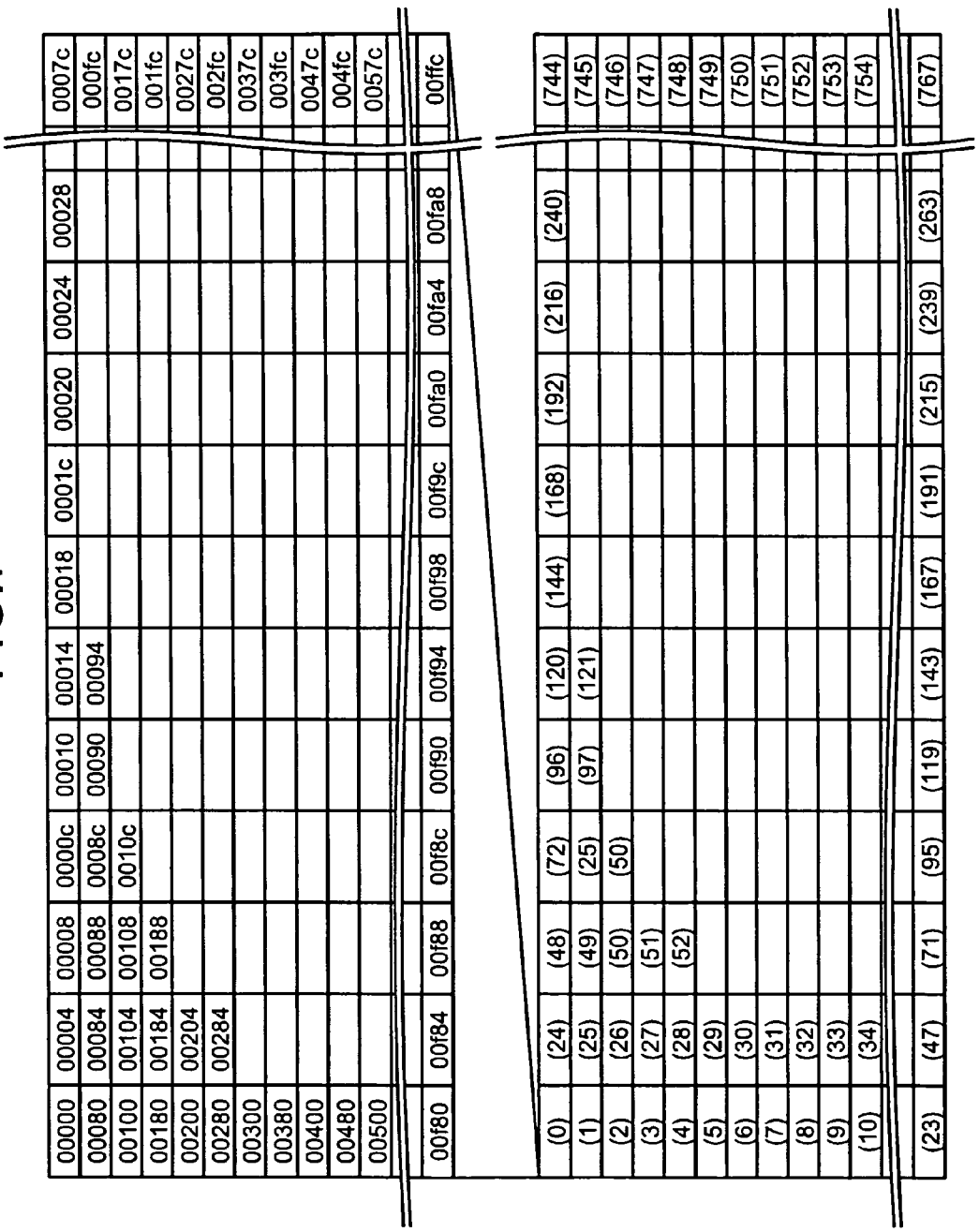
FIG. 7 is an explanatory diagram for showing an arrangement of addresses of a frame buffer incorporated in the image processing apparatus according to the first embodiment.

It is assumed that the frame buffer 142 having a structure as illustrated in FIG. 7 has 32×24 pages, or in other words, sequential regions of 3 megabytes (=32×24×4096 bytes) in the virtual address space.

On the other hand, when a virtual address is divided into 10, 10, and 12 bits as shown in FIG. 3, the PageDirectory includes 1024 entries (corresponding to 10 bits). The PageTable also includes 1024 entries. Because a page has 4096 bytes, each entry of the PageDirectory manages regions of 4 megabytes (=4096×1024).

For this reason, the frame buffer 142 formed of consecutive regions of 3 megabytes is usually managed by a single entry in the PageDirectory, unless it is positioned in the virtual address space in such a manner as to spread across the boundaries of entries of the PageDirectory. In addition, 768 out of the 1024 entries of the PageTable designated by the entry of the PageDirectory cover all the pages.

Figure 15:
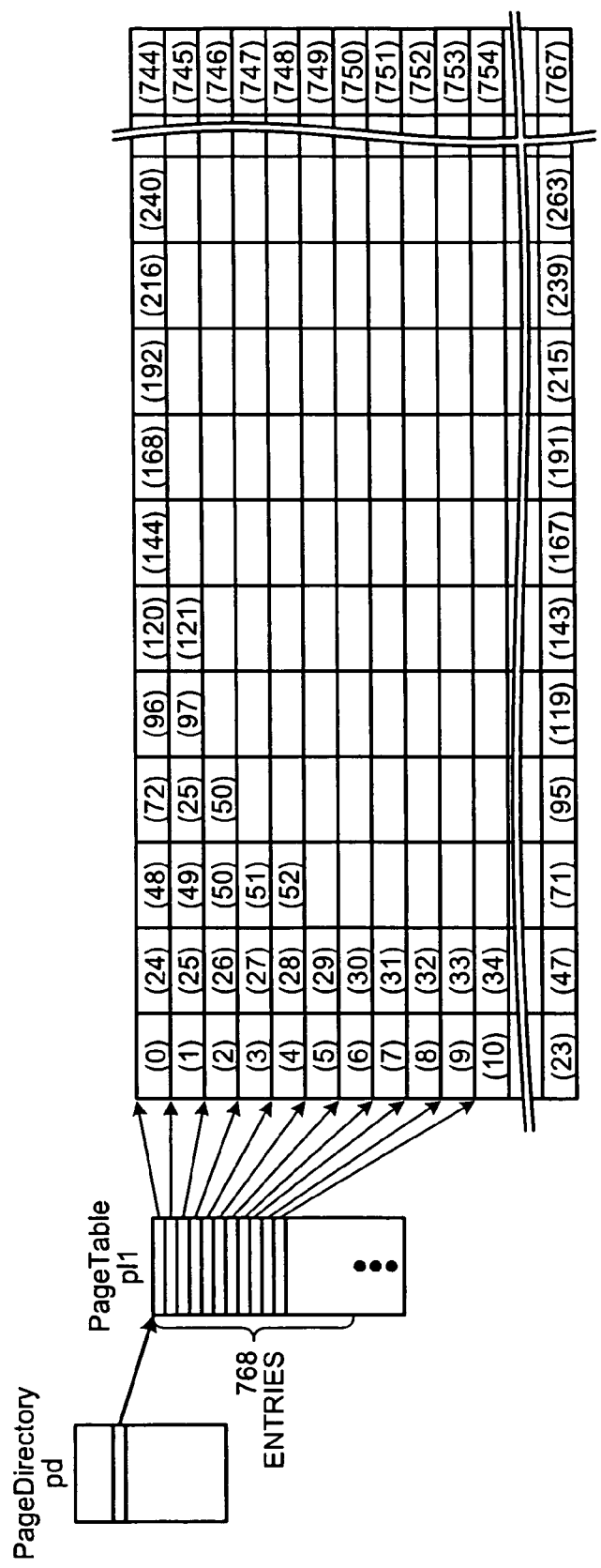
FIG. 15 is a schematic diagram for showing a correspondence between a conversion table and a frame buffer.

FIG. 15 is a schematic diagram showing the relationship between the conversion table and the frame buffer 142. When arranging the frame buffer 142 in the consecutive regions of the virtual address space, the Accessed bit of the entry in the PageDirectory that corresponds to the frame buffer 142 serves as a flag indicating whether there has been any memory access in the frame buffer 142. This flag is updated not only at the time of accessing to write, but also at the time of accessing to read.

Then, whenever a memory access is made, a search has to be conducted across all the 768 entries in the PageTable, which increases the load of the update portion detecting process.

Depending on regions of the virtual address space across which the frame buffer 142 is positioned, the structure of the conversion table (the PageDirectory and the PageTable) for the frame buffer 142 varies. This affects the efficiency of the search of an updated portion.

According to a modified embodiment, the screen is divided into the predetermined number of regions, and the regions are arranged in the virtual address space of the frame buffer 142 so that each of the regions corresponds to one entry in the PageDirectory. Because of this arrangement, the addresses of the frame buffer 142 in the virtual address space may become discontiguous.

Figure 16:
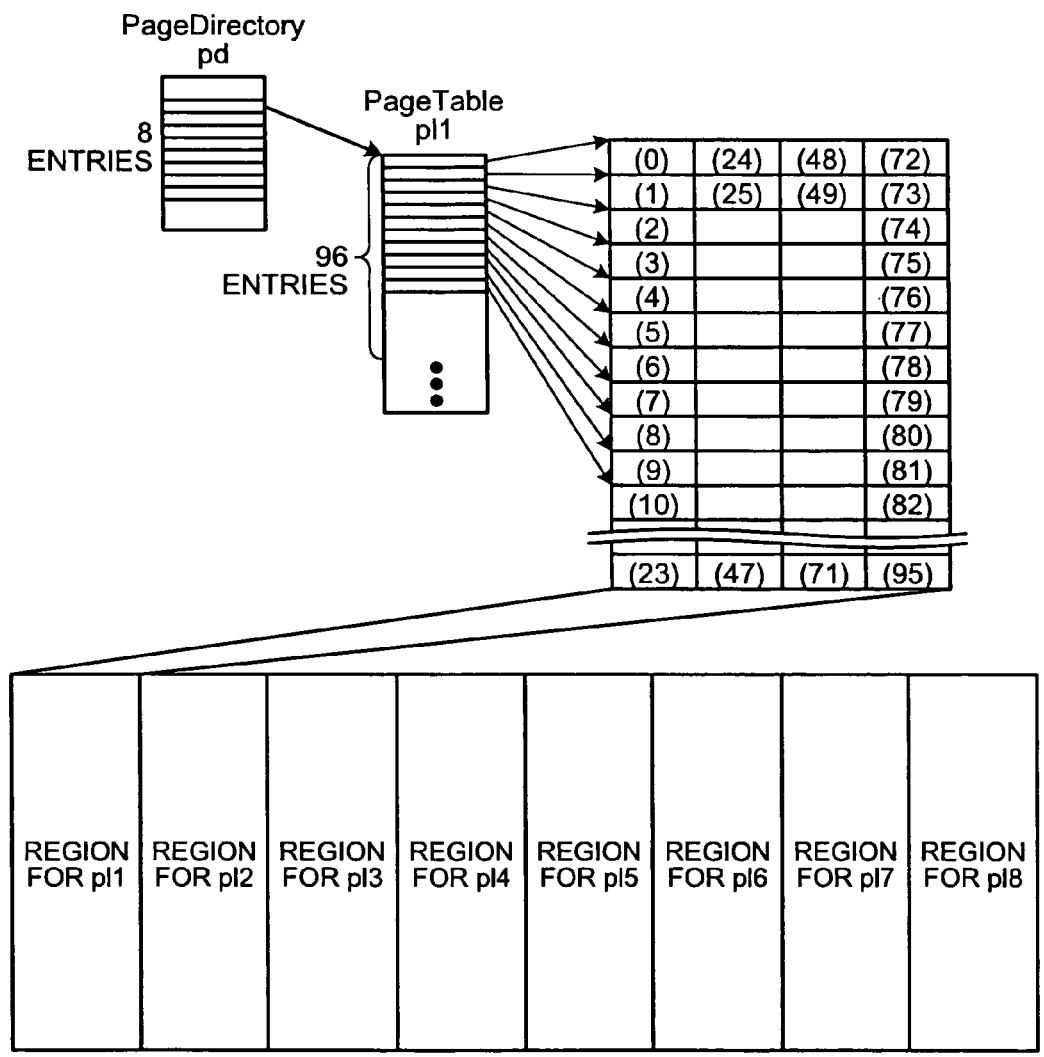
FIG. 16 is a schematic diagram for showing a correspondence between a conversion table and a frame buffer according to a modified example.

FIG. 16 is a diagram for showing an example where the screen is divided into eight regions, and an arrangement is made in such a manner that each of the regions corresponds to an entry in the PageDirectory.

With this arrangement, when the screen is updated only in the left end region (the region corresponding to pt1 of the PageTable), for example, the Accessed bit of the corresponding one of the eight entries in the PageDirectory is changed to 1. Then, only 96 entries in the PageTable that corresponds to the entry in the PageDirectory should be subjected to the search to detect an updated portion.

The screen division is not limited to the above manner. The screen may be divided into upper and lower regions or left and right regions, into 4×4 rectangles, or into the central and peripheral regions. Any dividing manner can be adopted in consideration of the pattern of updating the screen of the target application. In addition, the number of regions obtained from the division may be modified in accordance with the design to obtain large regions or small regions.

Furthermore, the explanation has focused on the two-level conversion table formed of the PageDirectory and the PageTables. However, a conversion table having more than two levels may be adopted. For instance, if the conversion table is three-level structured, the screen may be divided into left and right regions and brought into correspondence with the upper-level table. Then, each of the regions may be further divided into 2×2 regions and brought into correspondence with the medium-level table. The most effective manner of dividing the frame buffer 142 can be adopted in accordance with the structure of the conversion table that is to be used.

According to the first embodiment, a page exception is raised to the page for which writing is requested by use of the Writable bit that indicates the writable/non-writable state of writing into the page. Depending on the structure of the conversion table, however, the method of raising an exception by use of the Writable bit may not be applicable.

For instance, Secure Virtual Machine (SVM) is a program having a virtualization supporting function manufactured by Advanced Micro Devices to support virtualization at hardware level. A SVM-installed processor uses two conversion tables, a Guest PageTable and a Nested PageTable. In this processor, an access to the Nested PageTable is always dealt with as writing. With the method of using the Writable bits all of which are initially set to a non-writable state, an access even for reading may not be allowed.

According to a third embodiment, different virtual addresses are obtained for writing and for reading, and a page exception is raised to a page for which a writing access is requested, by use of an Enable bit instead of a Writable bit.

For the third embodiment, an image processing apparatus incorporating two conversion tables is explained as an example. In particular, the memory managing unit according to the third embodiment converts a logical memory address to a physical memory address in two steps, from a guest virtual address to a guest physical address and then to a host physical address, instead of the one-step method in which the conversion is performed from a virtual address to a physical address as adopted in the structure according to the first embodiment.

Figure 17:
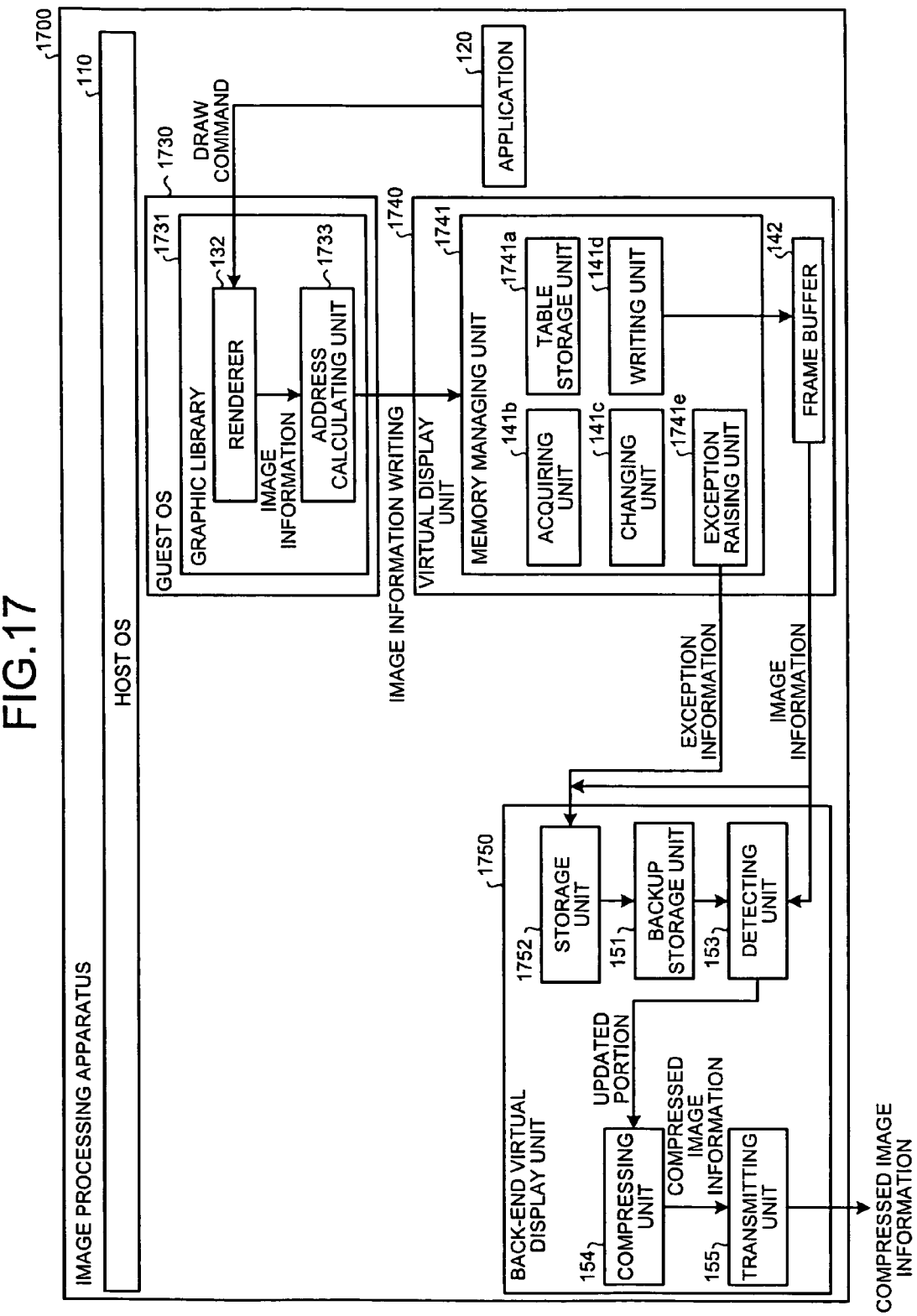
FIG. 17 is a block diagram of an image processing apparatus according to a third embodiment.

As shown in FIG. 17, an image processing apparatus 1700 includes the host OS 110, the application 120, a guest OS 1730, a virtual display unit 1740, and a back-end virtual display unit 1750.

The functions of the guest OS 1730, the virtual display unit 1740, and the back-end virtual display unit 1750 make differences between the first and third embodiments. The rest of the structure and functions is the same as the image processing apparatus 100 according to the first embodiment illustrated in the block diagram of FIG. 2. Thus, the same numerals are assigned, and the explanation thereof is omitted.

The guest OS 1730 is different from the guest OS 130 according to the first embodiment in the image displaying function of the graphic library 1731.

The graphic library 1731 includes the renderer 132 and an address calculating unit 1733. The function of the renderer 132 is the same as that of the first embodiment. The same numeral is therefore assigned to this component, and the explanation thereof is omitted.

The address calculating unit 133 according to the first embodiment finds the same address for writing data into the frame buffer 142 and reading data out of the frame buffer 142. On the other hand, the address calculating unit 1733 according to the third embodiment finds different addresses for writing data into the frame buffer 142 and reading data out of the frame buffer 142.

For instance, the frame buffer 142 having a structure as indicated in FIG. 7 includes 32×24-page addresses, or in other words a space of 3 megabytes (=32×24×4096 bytes) in the virtual address space. For this reason, the address calculating unit 1733 finds addresses, for example, with a 3-megabyte difference between when writing data into the frame buffer 142 and when reading data from the frame buffer 142.

Moreover, the address calculating unit 1733 divides the display screen of the terminal device 200 into 32×32-pixel rectangular regions, and obtains virtual addresses of the frame buffer 142 in such a manner that each of the pixels in a rectangular region corresponds to a one-page (4096-byte) virtual address, in a similar fashion to the address calculating unit 133 according to the first embodiment.

More specifically, for data reading, the address calculating unit 1733 converts the coordinate information (X, Y) to the address addr of the frame buffer 142 in accordance with the equation (2) as discussed in the structure according to the first embodiment. For data writing, on the other hand, the address calculating unit 1733 converts the coordinate information (X, Y) to the address addr of the frame buffer 142 in accordance with the equation (3).

$$addr = OFFSET + 3 \text{ megabytes} + ((X\&\sim 0\times 1f) << 10) \times 3 + ((X\&0\times 1f) << 2) + (Y << 7) \quad (3)$$

The added value does not have to be 3 megabytes as long as the addresses can be differentiated between data writing and reading. The optimization of the actual calculation equation also depends on the display mode and the calculation capacity of the address calculating unit 1733.

The virtual display unit 1740 includes a memory managing unit 1741 and the frame buffer 142. The structure of the frame buffer 142 is the same as the counterpart according to the first embodiment. Thus, the same numeral is assigned to this component, and the explanation thereof is omitted.

The memory managing unit 1741 includes a table storage unit 1741a, the acquiring unit 141b, the changing unit 141c, the writing unit 141d, and an exception raising unit 1741e. The structure and function of the memory managing unit 1741 is the same as those of the image processing apparatus 100 according to the first embodiment as illustrated in the block diagram of FIG. 2, except for the table storage unit 1741a and the exception raising unit 1741e. Thus, the same components are given the same numerals, and the explanation thereof is omitted.

The table storage unit 141a according to the first embodiment holds a single conversion table for converting a virtual address to a physical address. In contrast, the table storage unit 1741a according to the third embodiment holds two conversion tables for converting a virtual address to a physical address.

The two-step conversion is explained with reference to FIG. 18. In the two-step conversion, the two conversion tables are adopted to convert a guest virtual address to a guest physical address, and then convert the guest physical address to a host physical address.

Figure 18:
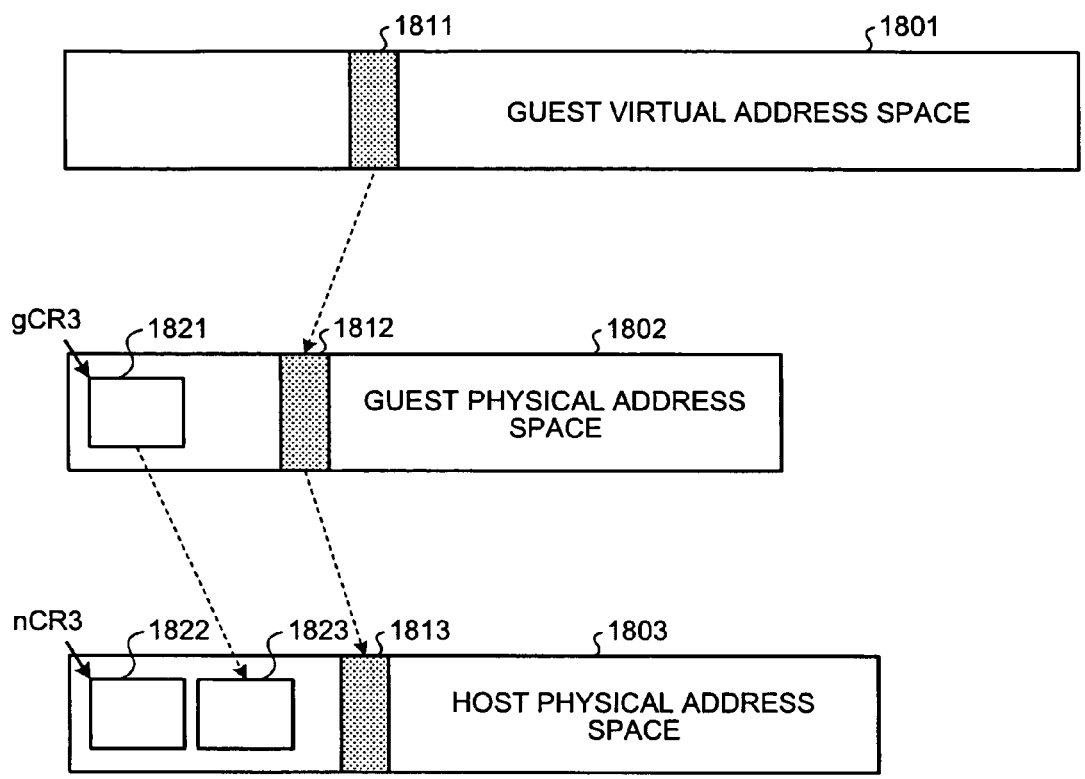
FIG. 18 is a diagram for showing an overview of a process of two-step address conversion.

FIG. 18 is a diagram for showing an example of converting a guest virtual address 1811 of a guest virtual address space 1801 to a guest physical address 1812 of a guest physical address space 1802, and then to a host physical address 1813 of a host physical address space 1803. In the first-step conversion, a first conversion table 1821 designated by a gCR3 register is referred to. The first conversion table 1821 is a conversion table prepared for each guest OS 1730. In actuality, the first conversion table 1821 is present in the host physical address space 1803, and the first conversion table 1821 and the first conversion table 1823 are identical. In the second-step conversion, the second conversion table 1822 designated by an nCR3 register is referred to.

More than one first conversion table 1823 may be present in accordance with the number of guest OSes 1730. The Guest PageTable and the Nested PageTable discussed above correspond to the first conversion table and the second conversion table, respectively.

The table storage unit 1741a stores therein two conversion tables, the first conversion table and the second conversion table. The entries in the PageDirectory and the PageTable included in the conversion tables and the method of specifying an entry that is to be used for conversion are the same as the first embodiment, and thus the explanation thereof is omitted.

When an access is made to a conversion table, whether the request is for writing or reading can be usually distinguished based on the information included in the access request. In some designs, however, an access to the second conversion table is always dealt with as a write request.

To distinguish a write request from a read request even in such designs, two different addresses for writing and for reading are prepared with respect to an entry in the PageTable corresponding to a page of the frame buffer 142 according to the third embodiment.

Figure 19:
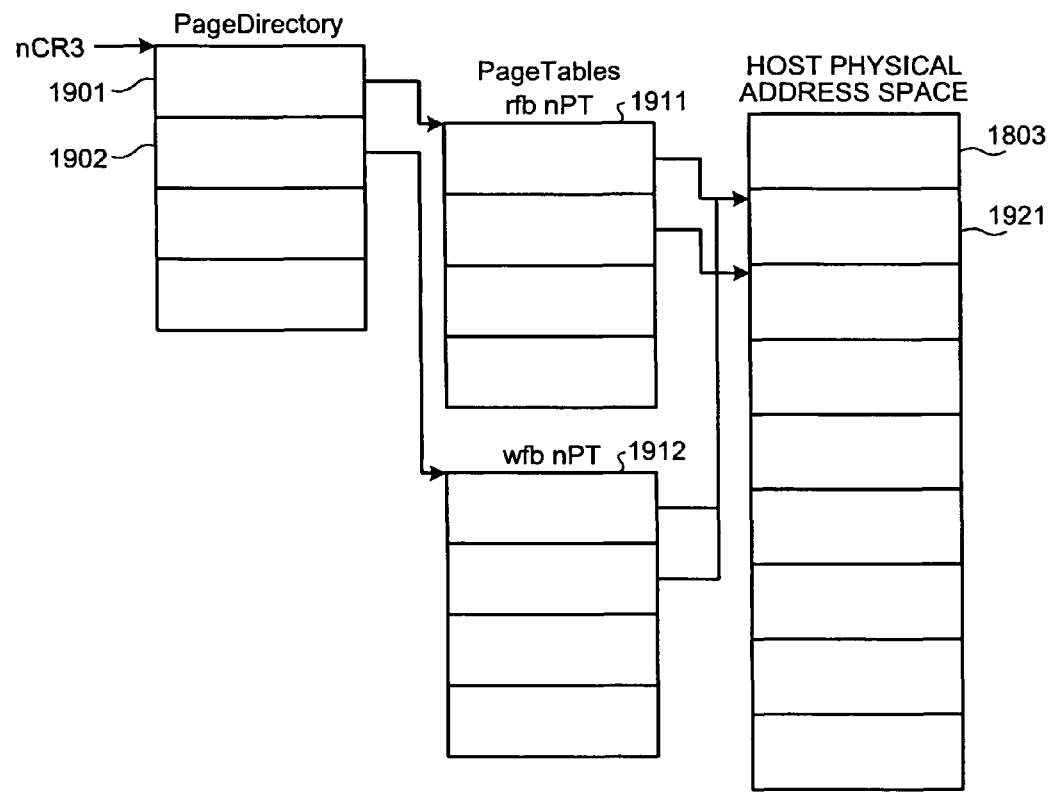
FIG. 19 is a diagram for showing an example of a PageTable according to the third embodiment.

As shown in FIG. 19, each of the regions of the frame buffer 142 are brought into correspondence with two virtual addresses, although only one frame buffer 142 is physically present.

For instance, entries 1901 and 1902 in the PageDirectory correspond to virtual addresses for reading and writing, respectively. The entry 1901 includes a pointer to a PageTable 1911 for reading, while the entry 1902 includes a pointer to a PageTable 1912 for writing. Hereinafter, the PageTable for writing data to the frame buffer 142 in the second conversion table is referred to as a write PageTable.

In FIG. 19, for example, the first entries of both of the PageTables 1911 and 1912 correspond to a host physical address 1921 in the host physical address space 1803.

As described above, the address calculating unit 1733 has different addresses for writing data into the frame buffer 142 and for reading data from the frame buffer 142. Even when an access is made to the same host physical address, a different PageTable is accessed depending on the write request or read request. Hence, even in the structure where an access to a conversion table is always dealt with as a write request, the device can determine whether the actual access is to write or to read, based on the PageTable that is accessed. This enables the device to suitably detect an updated page.

The exception raising unit 1741e in FIG. 17 is now described. The exception raising unit 141e according to the first embodiment raises a page exception when a write request is made to a page whose Writable bit indicates a non-writable state. On the other hand, the exception raising unit 1741e according to the third embodiment raises a page exception when a write request is made to an entry of a write PageTable whose Enable bit is invalid. All the Enable bits are set in advance to invalid. With this setting, a page exception can be always raised when a write request is made.

The back-end virtual display unit 1750 includes the backup storage unit 151, a storage unit 1752, the detecting unit 153, the compressing unit 154, and the transmitting unit 155. The structure and function of the back-end virtual display unit 1750 except for the storage unit 1752 are the same as the counterparts of the image processing apparatus 100 according to the first embodiment indicated in the block diagram of FIG. 2. Thus, the same numerals are assigned to the structural units, and the explanation thereof is omitted.

The storage unit 152 according to the first embodiment stores therein the image information of a page to which a page exception is raised when a write request is made for the page whose Writable bit indicates a non-writable state. On the other hand, the storage unit 1752 according to the third embodiment stores in the backup storage unit 151 image information of a page to which a page exception is raised by the exception raising unit 1741e when a write request is made to the page whose Enable bit is invalid.

Next, the image processing performed by the image processing apparatus 1700 according to the third embodiment is explained. First, an overview of the image writing process and the updated portion detecting process is given with reference to FIG. 20.

In the image writing process, the Enable bits of all the write PageTables associated with the frame buffer 142 in the second conversion table are set to invalid. When the graphic library 131 tries to write into any of the regions of the frame buffer 142 thereafter, a page exception is raised to the corresponding page.

In this situation, the application 120 sends a draw command to the frame buffer 142 by way of the graphic library 1731 for a screen display (1). The memory managing unit 1741 converts the virtual address designated by the draw command sent from the graphic library 1731 to a physical address by referring to the two conversion tables (2).

Because the Enable bits of the write PageTable are set to invalid in advance, the exception raising unit 1741e raises a page exception when the second conversion table is referred to (3). Owing to the page exception, the storage unit 1752 detects the page of the frame buffer 142 for which the graphic library 1731 has requested an update, and saves a backup of the content of the page (4).

Meanwhile, the changing unit 141c changes the Writable bits of the PageTable of the page to valid (5). Then, the graphic library 1731 is allowed to continue the image writing process. The image writing to this page is performed without a further page exception. A page exception is raised when trying to perform image writing to another page (3) so that the processes of backing up the content of the page (4) and changing the Enable bit of the PageTable (5) are sequentially performed.

Next, with a trigger from the timer, the detecting unit 153 begins the updated portion detecting process (6). The detecting unit 153 detects a page for which a backup is stored (4) as an updated page (7). Next, the detecting unit 153 compares the backup of the image information with the latest image information written in the frame buffer 142, and detects a rectangle including the updated portion (8). It should be noted that, as shown in FIG. 20, the detecting unit 153 can detect a rectangular region of the minimum size including the updated portion from several adjacent pages, as an updated portion.

The image information of the detected updated portion is compressed by the compressing unit 154. The compressed image information is transmitted to the terminal device 200 by the transmitting unit 155 (9).

Figure 20:
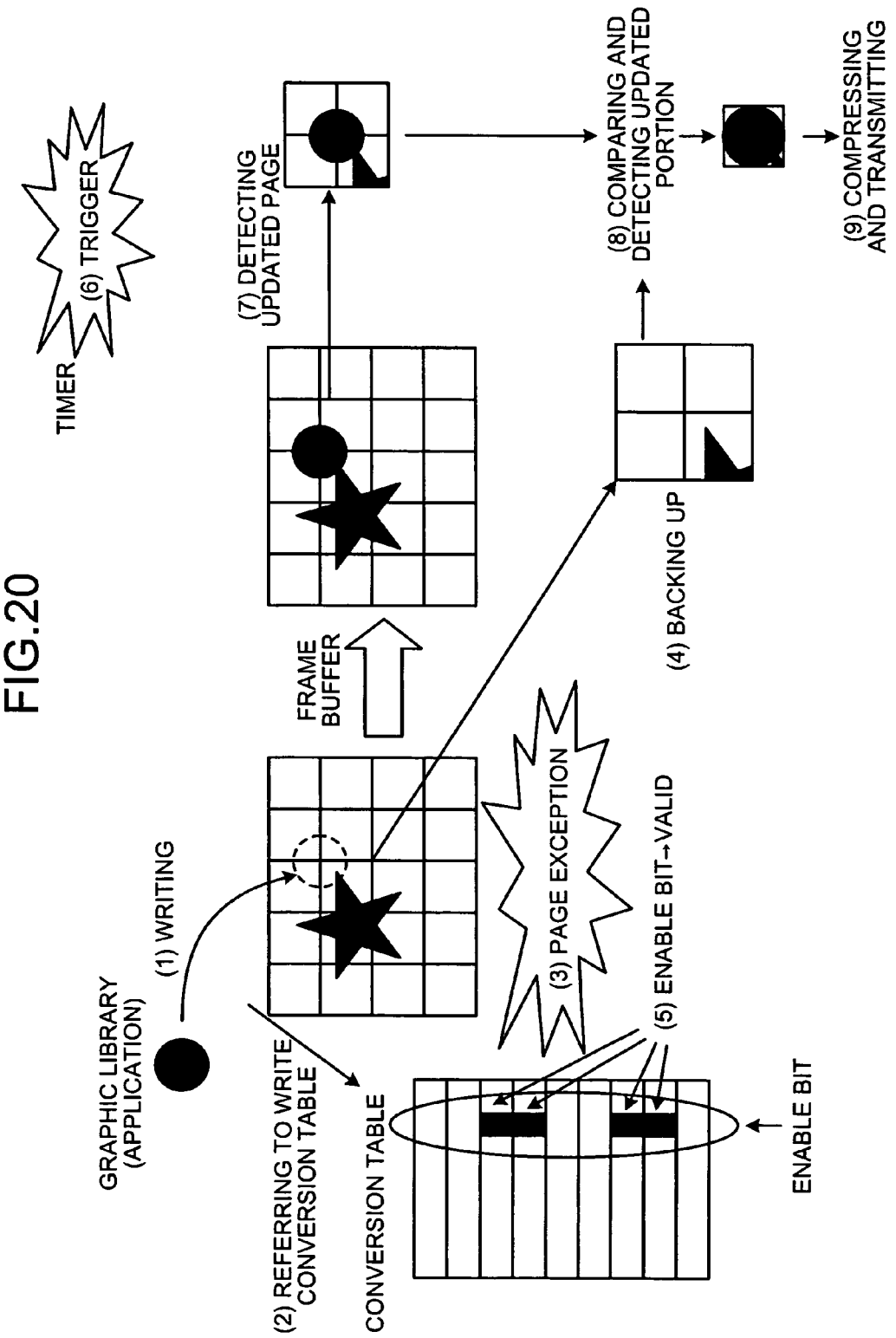
FIG. 20 is an explanatory diagram for showing an overview of an image writing process and an updated portion detecting process according to the third embodiment.

It should be noted that, after the compressed image information of the updated portion is transmitted to the terminal device 200, the image information backed up in the backup storage unit 151 is deleted, although it is not illustrated in FIG. 20. In addition, the Enable bits of all the write PageTables associated with the frame buffer 142 in the second conversion table are changed to invalid. In the drawing, the processes of raising the page exception (3), backing up (4), and changing the Enable bit (5) are illustrated as being implemented for four pages altogether. In actuality, however, these processes are executed for four times in response to the writing from the graphic library 1731.

Figure 21:
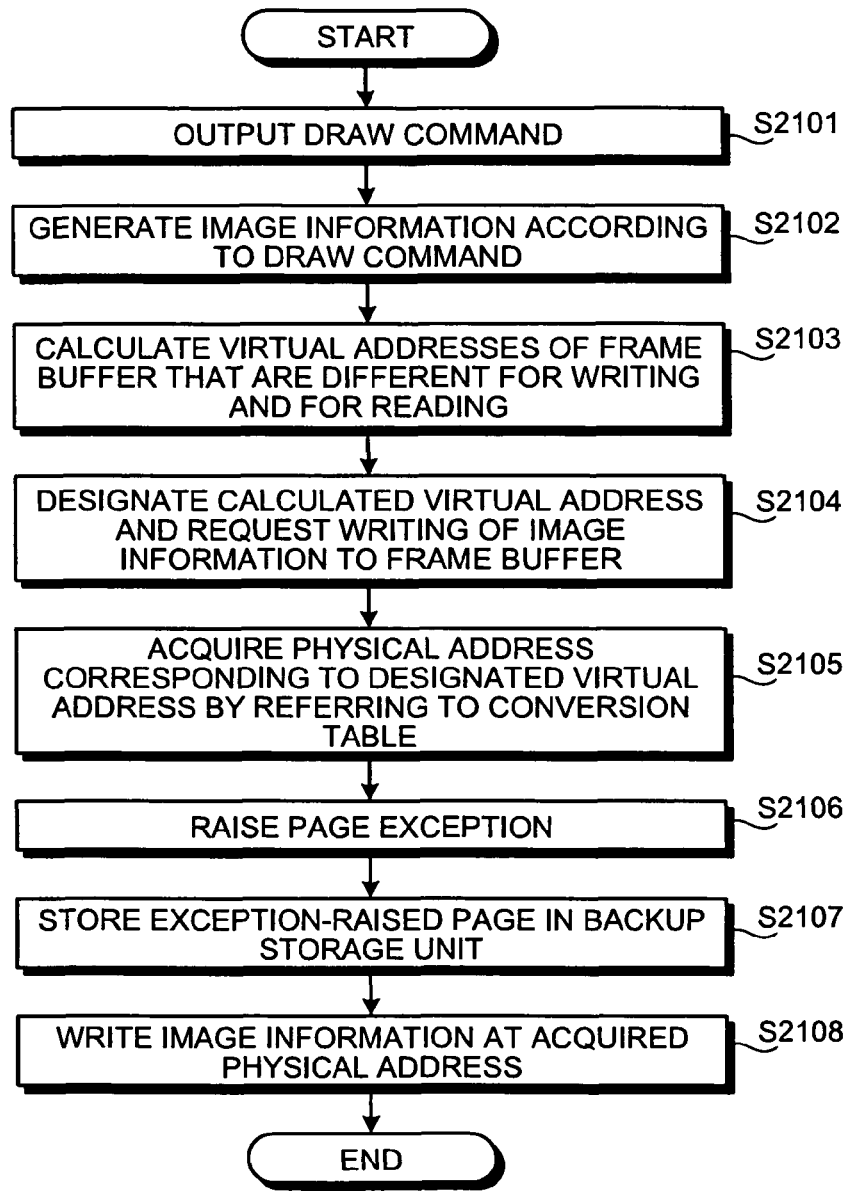
FIG. 21 is a flowchart of the entire image writing process according to the third embodiment.

The image writing process is explained below with reference to FIG. 21. In comparison with the image writing process according to the first embodiment indicated in FIG. 9, the only difference resides in the processes at step S2103 and at step S903 of FIG. 9. Thus, the explanation of the process except for step S2103 is omitted.

At step S2103, the address calculating unit 1733 calculates a virtual address in accordance with the equation (2) or (3), depending on the access request being for reading or writing. The address calculating unit 1733 can determine whether the access request is for reading or writing, based on the draw command.

Figure 10:
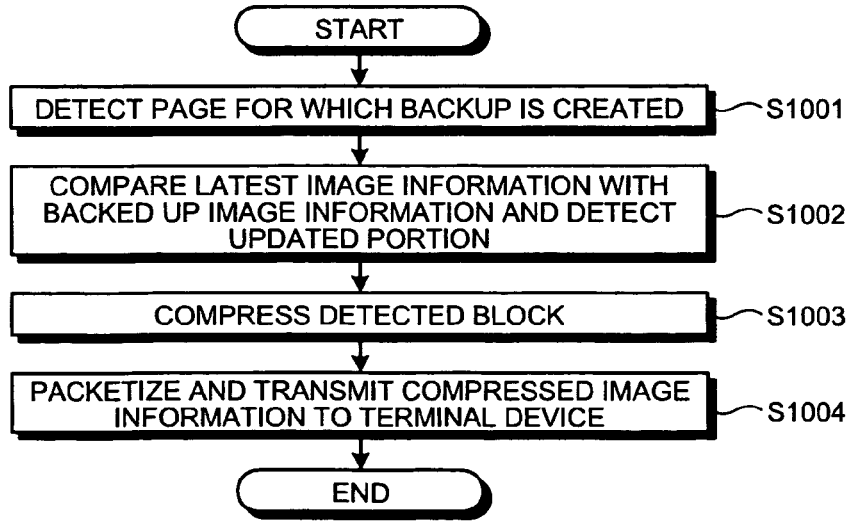
FIG. 10 is a flowchart of the entire updated portion detecting process according to the first embodiment.

The updated portion detecting process is the same as the updated portion detecting process according to the first embodiment indicated in FIG. 10, and thus the explanation thereof is omitted.

The image processing apparatus according to the third embodiment calculates different virtual addresses for writing and reading. Furthermore, the image processing apparatus uses the Enable bit to raise a page exception to the page for which a write access is made, and detects an updated page based on this page exception. With this arrangement, even when an exception cannot be raised in accordance with a Writable bit, an updated portion of the image information can still be effectively detected. The load of the image updated portion detecting process in the structure where the frame buffer is managed by the virtual memory system can be thereby reduced.

Figure 22:
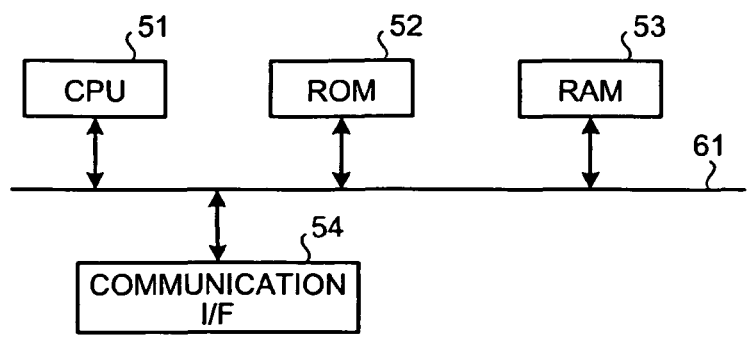
FIG. 22 is an explanatory diagram for showing a hardware structure of the image processing apparatus according to the first to third embodiments.

The hardware structure of the image processing apparatus according to the first to third embodiments is explained with reference to FIG. 22.

The image processing apparatus according to the first to third embodiments comprises a control device such as a central processing unit (CPU) 51, memory devices such as a read only memory (ROM) 52 and a RAM 53, a communication interface 54 that connects the image processing apparatus to a network to conduct communications, an external memory device such as a hard disk drive (HDD) and a compact disc (CD) drive, a display device, an input device such as a keyboard and a mouse, and a bus 61 that connects these components to one another. The image processing apparatus is provided with a hardware structure using a regular computer.

An image processing program executed by the image processing apparatus according to the first to third embodiments is offered in a computer readable recording medium such as a compact disk read only memory (CD-ROM), a flexible disk (FD), a compact disk recordable (CD-R), and a digital versatile disk (DVD) as a file in an installable or executable format.

Further, the image processing program executed by the image processing apparatus according to the first to third embodiments may be stored on a computer connected to a network such as the Internet and downloaded by way of the network. In addition, the image processing program executed by the image processing apparatus according to the first to third embodiments may be offered or distributed by way of a network such as the Internet.

Moreover, the image processing program according to the first to third embodiments may be offered by incorporating it in a ROM or the like in advance.

The image processing process executed by the image processing apparatus according to the first to third embodiments has a module structure of the units that have been discussed (the address calculating unit, the acquiring unit, the writing unit, the detecting unit, and the compressing unit). As an actual hardware structure, the CPU 51 (processor) reads the image processing program from the recording medium and executes the program. Then, all the units are loaded and generated on the main memory device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus that generates image information for displaying a screen on a terminal device connected thereto via a network and transmits the image information to the terminal device, the apparatus comprising:
a first image storage unit that stores the image information that is to be transmitted to the terminal device;
a table storage unit that stores a conversion table that is used to convert a virtual address of the first image storage unit to a physical address in units of pages defined in a storage region of the first image storage unit in correspondence with a rectangular region of a predetermined size included in the screen;
an address calculating unit that calculates the virtual address corresponding to a pixel included in the rectangular region;
an acquiring unit that acquires the physical address corresponding to the virtual address calculated for each pixel of the image information for which writing is requested, based on the conversion table stored in the table storage unit;
a writing unit that writes the image information for which the writing is requested into the physical address acquired by the acquiring unit;
a detecting unit that detects in units of the pages, an updated portion of the image information that is a portion in which the image information does not match before and after the writing; and
a compressing unit that compresses the image information of the updated portion detected by the detecting unit.

2. The apparatus according to claim 1, further comprising:
a second image storage unit that stores the image information in units of the pages;
an exception raising unit that raises an interrupt of a page exception when the writing is requested to the page having the virtual address of the image information that is requested to be written; and
a storage unit that stores in the second image storage unit the image information that is stored in the page to which the page exception is raised, a content of the image information being in a state before the writing performed by the writing unit,
wherein the detecting unit further detects the page the image information of which is stored in the second image storage unit, as the page having the image information that is updated.

3. The apparatus according to claim 2, wherein the detecting unit detects, for each of the updated pages, the updated portion by comparing the image information stored in the second image storage unit with the image information stored in the first image storage unit after the writing performed by the writing unit.

4. The apparatus according to claim 1, wherein
the table storage unit further stores first judgment information that indicates whether the writing is performed on each of the pages,
the apparatus further comprises a changing unit that changes the first judgment information of the page including the virtual address of the image information for which the writing is requested, to indicate that the writing is performed, and
the detecting unit further detects the page having the first judgment information indicating that the writing is performed, as the page having the image information that is updated.

5. The apparatus according to claim 4, further comprising:
a second image storage unit that stores the image information a content of which is in a state before the writing performed by the writing unit; and
a storage unit that stores in the second image storage unit the image information a content of which is in a state after the writing, after the writing unit writes the image information,
wherein the detecting unit compares, for each of the updated pages, the image information stored in the second image storage unit with the image information stored in the first image storage unit, the content of which is in the state after the writing performed by the writing unit, and thereby detects the updated portion.

6. The apparatus according to claim 4, wherein
the table storage unit stores second judgment information that indicates whether the pages in a group have been referred to, for each group having a predetermined number of pages;
the changing unit changes the second judgment information to indicate that the group including the page that has the virtual address of the image information for which the writing is requested has been referred to, and
the detecting unit detects the group having the second judgment information that indicates the group has been referred to, and detects the page having the first judgment information that indicates that the writing is performed, from among the pages included in the group that is detected, as the page having the image information that is updated.

7. The apparatus according to claim 6, wherein the table storage unit stores the second judgment information for each group of the pages in correspondence with each of rectangular regions included in divisional regions obtained by dividing the screen.

8. The apparatus according to claim 1, wherein the address calculating unit calculates the virtual addresses of pixels in a line that are arranged consecutively in a specific direction and also consecutively across adjacent lines, with respect to the line including pixels adjacent to one another in the specific direction that is either one of a horizontal direction or a vertical direction within the rectangular region.

9. The apparatus according to claim 1, wherein
the address calculating unit calculates a first virtual address when writing to the image information is requested, and calculates a second virtual address when reading of the same image information is requested;
the table storage unit stores the conversion table to convert the first virtual address and the second virtual address to the same physical address;

the apparatus further comprises:
a second image storage unit that stores the image information in the units of pages;
an exception raising unit raises an interrupt of a page exception when the writing to the page including the first virtual address is requested; and
a storage unit that stores in the second image storage unit the image information that is stored in the page to which the page exception is raised and has a content in a state before the writing performed by the writing unit,
the detecting unit detects the page having the image information that is stored in the second image storage unit as the page having the image information that is updated.

10. A method of detecting an update of image information in an image processing apparatus that generates image information for displaying a screen on a terminal device connected thereto via a network and transmits the image information to the terminal device, the apparatus includes:
a first image storage unit that stores the image information that is to be transmitted to the terminal device; and
a table storage unit that stores a conversion table that is used to convert a virtual address of the first image storage unit to a physical address in units of pages defined in a storage region of the first image storage unit in correspondence with a rectangular region of a predetermined size included in the screen;
the method comprising:
calculating the virtual address corresponding to a pixel included in the rectangular region;
acquiring the physical address corresponding to the virtual address calculated for each pixel of the image information for which writing is requested, based on the conversion table stored in the table storage unit;
writing the image information for which the writing is requested into the acquired physical address; and
detecting in units of the pages, an updated portion of the image information that is a portion in which the image information does not match before and after the writing.

11. A computer program product having a non-transitory computer readable medium including program instructions stored therein for detecting an update of image information in an image processing apparatus that generates image information for displaying a screen on a terminal device connected thereto via a network and transmits the image information to the terminal device, the apparatus includes:
a first image storage unit that stores the image information that is to be transmitted to the terminal device; and
a table storage unit that stores a conversion table that is used to convert a virtual address of the first image storage unit to a physical address in units of pages defined in a storage region of the first image storage unit in correspondence with a rectangular region of a predetermined size included in the screen,
wherein the instructions, when executed by a computer, cause the computer to perform steps comprising:
calculating the virtual address corresponding to a pixel included in the rectangular region;
acquiring the physical address corresponding to the virtual address calculated for each pixel of the image information for which writing is requested, based on the conversion table stored in the table storage unit;
writing the image information for which the writing is requested into the acquired physical address; and
detecting in units of the pages, an updated portion of the image information that is a portion in which the image information does not match before and after the writing.

* * * * *